United States Patent
Koshiba et al.

(10) Patent No.: US 12,061,314 B2
(45) Date of Patent: Aug. 13, 2024

(54) VEHICLE-MOUNTED CAMERA AND MOBILE BODY

(71) Applicant: KYOCERA Corporation, Kyoto (JP)

(72) Inventors: Yasushi Koshiba, Yokohama (JP); Takahiro Okada, Yokohama (JP); Hiroyuki Abe, Kawasaki (JP); Hiroshi Nakao, Kirishima (JP); Riyou Morishima, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 778 days.

(21) Appl. No.: 17/263,545

(22) PCT Filed: Jul. 26, 2019

(86) PCT No.: PCT/JP2019/029517
§ 371 (c)(1),
(2) Date: Jan. 26, 2021

(87) PCT Pub. No.: WO2020/022505
PCT Pub. Date: Jan. 30, 2020

(65) Prior Publication Data
US 2021/0231839 A1    Jul. 29, 2021

(30) Foreign Application Priority Data
Jul. 27, 2018 (JP) .................. 2018-141840

(51) Int. Cl.
*G02B 1/12* (2006.01)
*B60R 11/04* (2006.01)
(Continued)

(52) U.S. Cl.
CPC ............... *G02B 1/12* (2013.01); *B60R 11/04* (2013.01); *B60S 1/56* (2013.01); *G02B 7/02* (2013.01);
(Continued)

(58) Field of Classification Search
CPC ... G02B 1/12; G02B 1/18; G02B 7/02; G02B 7/022; G02B 7/0006; B60R 11/04;
(Continued)

(56) References Cited

U.S. PATENT DOCUMENTS 7,387,454 B2    6/2008    Kikuchi et al.
9,538,054 B2    1/2017    Hayakawa et al.
(Continued)

FOREIGN PATENT DOCUMENTS

CN    201161573 Y    12/2008
JP    2003204928 A    7/2003
(Continued)

*Primary Examiner* — Timothy R Newlin
(74) *Attorney, Agent, or Firm* — Studebaker & Brackett PC

(57) ABSTRACT

A vehicle-mounted camera and a mobile body that improve the quality of a captured image are provided. The vehicle-mounted camera includes a lens arranged closest to a subject side and a housing that supports the lens. The lens is at least partially subjected to a surface treatment that changes its water-contact characteristics, or the housing has at least a shape to change its water-contact characteristics or is at least subjected to a surface treatment that changes the water-contact characteristics.

19 Claims, 15 Drawing Sheets

(51) Int. Cl.
  *B60S 1/56* (2006.01)
  *G02B 7/02* (2021.01)
  *G03B 17/08* (2021.01)
  *B60R 11/00* (2006.01)

(52) U.S. Cl.
  CPC ........ *G03B 17/08* (2013.01); *B60R 2011/004* (2013.01)

(58) Field of Classification Search
  CPC ..... B60R 2011/004; B60S 1/56; G03B 17/08; G03B 17/02; H04N 23/52; H04N 23/55
  See application file for complete search history.

(56) References Cited

U.S. PATENT DOCUMENTS

| | | | |
|---|---|---|---|
| 10,317,671 B2 | 6/2019 | Irie et al. | |
| 11,493,922 B1* | 11/2022 | Avram | B60W 40/02 |
| 2004/0121168 A1 | 6/2004 | Goodwin et al. | |
| 2006/0062570 A1 | 3/2006 | Kikuchi et al. | |
| 2007/0275326 A1* | 11/2007 | Hatakeyama | G03F 7/2041 |
| | | | 430/273.1 |
| 2008/0112050 A1 | 5/2008 | Nomura | |
| 2009/0088020 A1* | 4/2009 | Abe | H01R 13/6658 |
| | | | 439/519 |
| 2009/0117490 A1* | 5/2009 | Endo | G03F 7/0046 |
| | | | 430/286.1 |
| 2009/0186300 A1* | 7/2009 | Furuya | G03F 7/0046 |
| | | | 526/245 |
| 2009/0208728 A1* | 8/2009 | Itami | C08G 65/336 |
| | | | 556/478 |
| 2010/0053547 A1* | 3/2010 | Baude | G02B 27/0006 |
| | | | 351/159.01 |
| 2011/0097667 A1* | 4/2011 | Hirano | G03F 7/0045 |
| | | | 526/287 |
| 2013/0147072 A1* | 6/2013 | Bothe | B29D 11/00038 |
| | | | 264/1.36 |
| 2015/0136226 A1* | 5/2015 | Guo | B23K 26/0006 |
| | | | 428/141 |
| 2015/0296108 A1* | 10/2015 | Hayakawa | B60S 1/0848 |
| | | | 348/148 |
| 2015/0338679 A1* | 11/2015 | Hervieu | G02B 1/18 |
| | | | 351/159.01 |
| 2016/0103315 A1 | 4/2016 | Weber | |
| 2016/0168021 A1* | 6/2016 | Goh | C09D 1/00 |
| | | | 427/256 |
| 2016/0245960 A1* | 8/2016 | Katayama | G02B 1/041 |
| 2016/0249608 A1* | 9/2016 | Cadet | A01N 25/34 |
| | | | 424/411 |
| 2016/0251126 A1* | 9/2016 | Iwasaki | B65D 41/04 |
| | | | 215/41 |
| 2017/0097446 A1* | 4/2017 | Fournand | B29D 11/00942 |
| 2017/0365425 A1* | 12/2017 | Aartsen | H01H 3/42 |
| 2018/0229420 A1* | 8/2018 | Couderc | G02B 27/0006 |
| 2019/0187455 A1* | 6/2019 | Iwasaki | G06V 40/19 |
| 2020/0181426 A1* | 6/2020 | Cao | A61K 47/6915 |
| 2021/0032477 A1* | 2/2021 | Ijeri | B05D 5/083 |

FOREIGN PATENT DOCUMENTS

| | | |
|---|---|---|
| JP | 2006091249 A | 4/2006 |
| JP | 2008148276 A | 6/2008 |
| JP | 2009-157194 A | 7/2009 |
| JP | 2014182255 A | 9/2014 |
| JP | 2015018106 A | 1/2015 |
| JP | 2015154264 A | 8/2015 |
| JP | 2015-231216 A | 12/2015 |
| JP | 2018004921 A | 1/2018 |
| WO | 2014017405 A1 | 1/2014 |

* cited by examiner

VEHICLE-MOUNTED CAMERA AND MOBILE BODY

CROSS REFERENCE TO RELATED APPLICATION

This application claims priority to and the benefit of Japanese Patent Application No. 2018-141840 filed on Jul. 27, 2018, the entire contents of which are incorporated herein by reference.

TECHNICAL FIELD

The present disclosure relates to a vehicle-mounted camera and a mobile body.

BACKGROUND

Conventionally, vehicle-mounted cameras mounted on mobile bodies such as vehicles are known. Various contrivance to improve the quality of a captured image are implemented. For example, a vehicle-mounted camera includes a lens provided with a hydrophilic filter including a photocatalytic substance to decompose organic substances attached to the lens using ultraviolet rays. The photocatalytic substance decomposes organic substances attached to the hydrophilic surface using ultraviolet rays.

SUMMARY

A vehicle-mounted camera according to an embodiment of the present disclosure includes a lens arranged closest to a subject side and a housing that supports the lens. The lens is at least partially subjected to a surface treatment that changes its water-contact characteristics, or the housing has at least a shape to change its water-contact characteristics or is at least subjected to a surface treatment that changes the water-contact characteristics.

A mobile body according to an embodiment of the present disclosure includes a vehicle-mounted camera that includes a lens arranged closest to a subject side and a housing that supports the lens.

DETAILED DESCRIPTION

Conventional vehicle-mounted cameras have room for improvement in the quality of captured images.

The present disclosure provides a vehicle-mounted camera and a mobile body that improve the quality of a captured image.

According to an embodiment of the present disclosure, the vehicle-mounted camera and the mobile body that improve the quality of a captured image can be provided.

Hereinafter, embodiments of the present disclosure will be described with reference to the drawings. The figures used in the following description are merely schematic. The drawings may not necessarily be drawn to scale.

Figure 26:
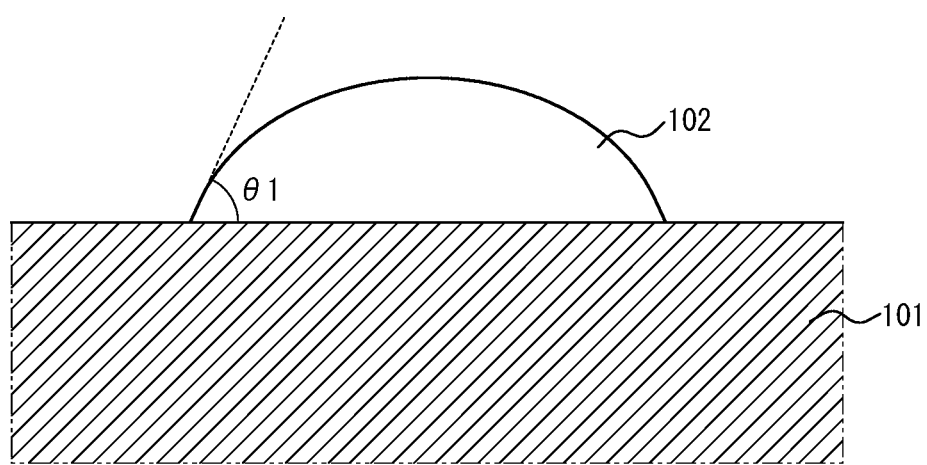
FIG. 26 is a diagram illustrating a contact angle.

The term "contact angle" used herein is an angle formed by a solid surface and a surface of a droplet (a liquid droplet) sitting on the solid surface. For example, the contact angle is an angle $\theta 1$ as illustrated in FIG. 26. The larger the droplet spreads on the surface of the solid, the smaller the contact angle of the droplet on the solid surface. Thus, the contact angle can function as an index for evaluating the wettability of the solid surface with respect to a liquid. When the liquid is water, the wettability is also referred to as hydrophilicity or water repellency. In the present disclosure, a specific value of the water-contact angle is measured by an apparatus represented by a dynamic contact angle measuring apparatus produced by First Ten Angstroms, Inc. or the like, under the condition that 5 μl of pure water is dropped on the solid surface.

Figure 27:
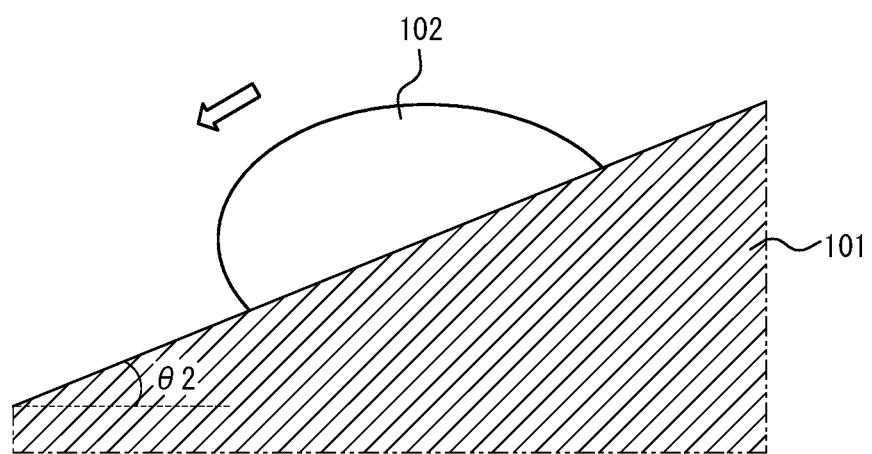
FIG. 27 is a diagram illustrating a slide angle.

The term "slide angle" as used herein is an inclination angle of the solid surface at which a droplet starts sliding, after the droplet is attached to the solid surface horizontally arranged and the sold surface is gradually tilted. For example, the slide angle is an angle θ2 as illustrated in FIG. 27. The harder for the droplets to attach to the solid surface, the smaller the slide angle of the droplet on the solid surface. Thus, the slide angle can function as an index for evaluating removability of the solid surface with respect to a droplet thereon. In the present disclosure, a particular value of the slide angle of water is measured by an apparatus represented by a dynamic contact angle measuring apparatus produced by First Ten Angstroms, Inc. or the like, under the condition that 5 to 20 μl of pure water is dropped on the solid surface.

Figure 1:
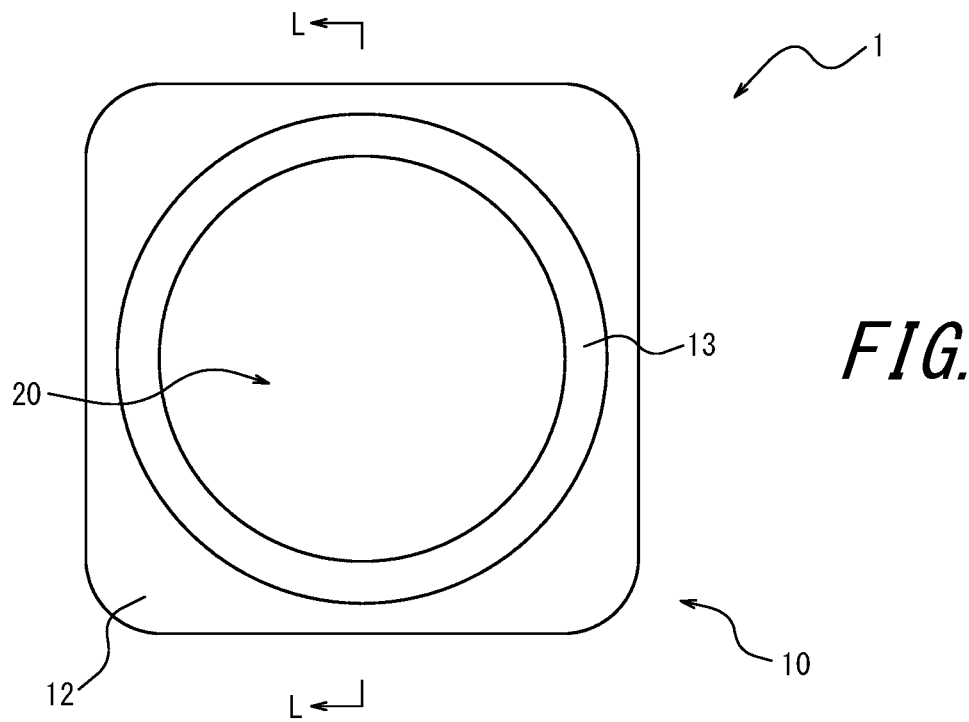
FIG. 1 is an elevation view of a vehicle-mounted camera according to a first embodiment of the present disclosure.

The term "downward direction" as used herein means a direction directed to a ground surface from a vehicle-mounted camera 1 illustrated in FIG. 1 or the like in a case in which the vehicle-mounted camera 1 is mounted on the mobile body. Also, the term "upward direction" as used herein means a direction opposite from the "downward direction".

First Embodiment

Figure 2:
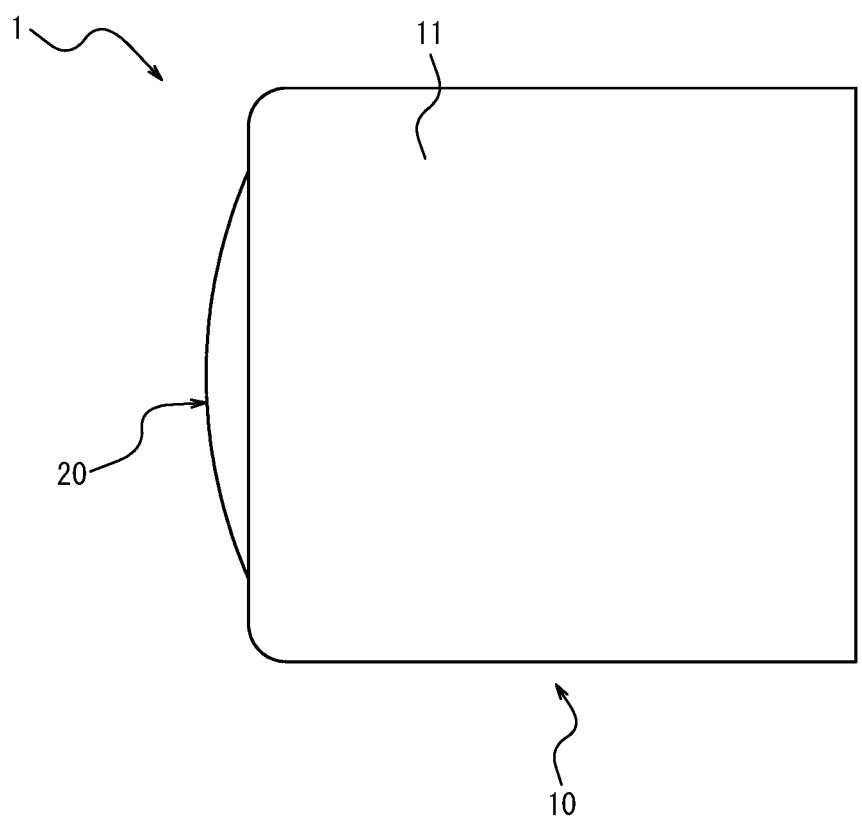
FIG. 2 is a side view of the vehicle-mounted camera illustrated in FIG. 1.
Figure 3:
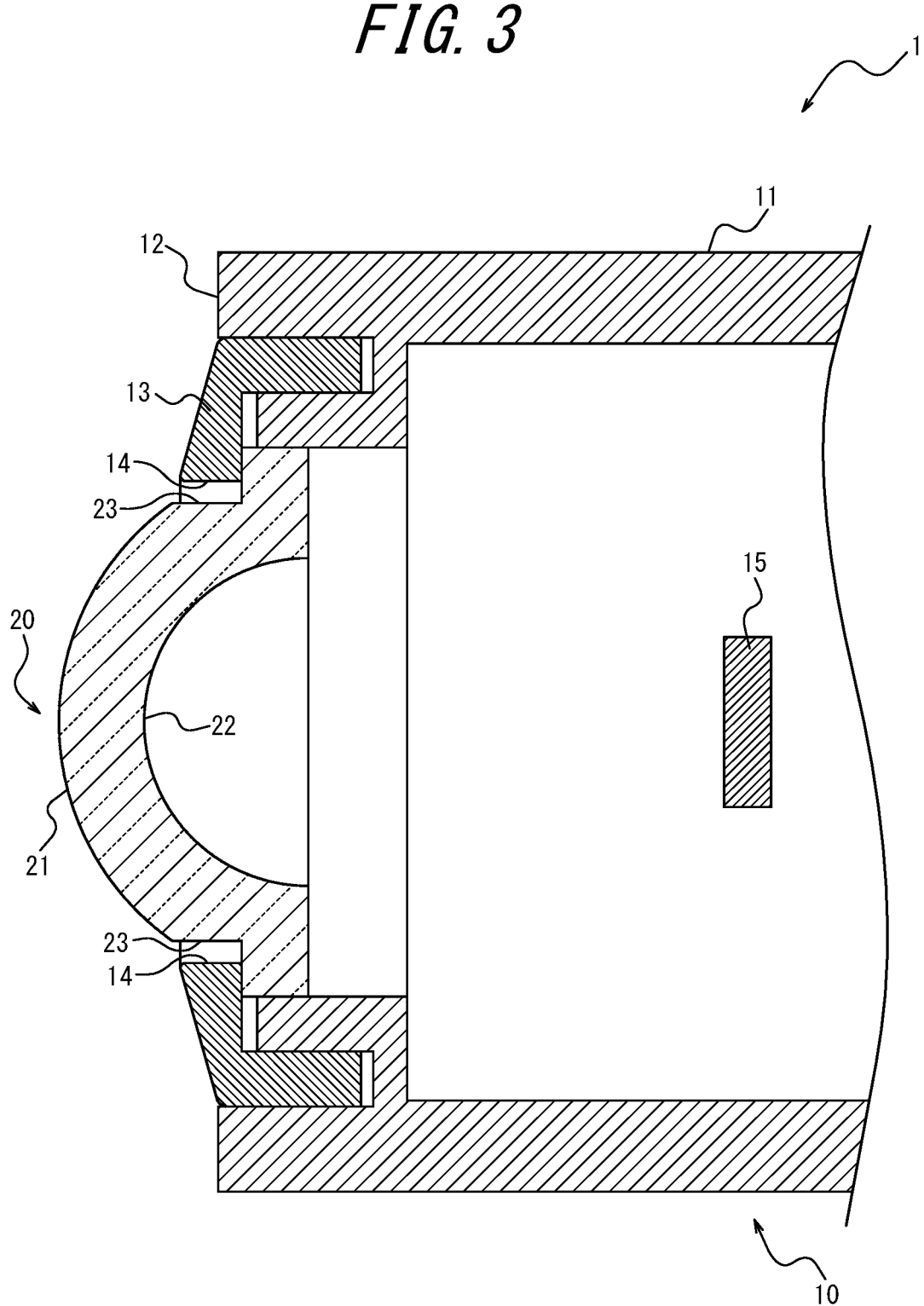
FIG. 3 is a cross-sectional view of the vehicle-mounted camera taken along line L-L illustrated in FIG. 1.

FIG. 1 is an elevation view of the vehicle-mounted camera 1 according to a first embodiment of the present disclosure. FIG. 2 is a side view of the vehicle-mounted camera 1 illustrated in FIG. 1. FIG. 3 is a cross-sectional view of the vehicle-mounted camera 1 taken along line L-L illustrated in FIG. 1.

The vehicle-mounted camera 1 is mounted on a mobile body. The vehicle-mounted camera 1 may be arranged on the exterior of the mobile body. The vehicle-mounted camera 1 generates a captured image of, for example, the surroundings of the mobile body on which the vehicle-mounted camera 1 is mounted. The vehicle-mounted camera 1 includes a housing 10 and a lens 20, as illustrated in FIG. 1 to FIG. 3. The lens included in the vehicle-mounted camera 1 is not limited to one lens 20. The vehicle-mounted camera 1 may include two or more lenses.

In the vehicle-mounted camera 1 of the present disclosure, the lens 20 is at least partially subjected to a surface treatment that changes its waver-contact characteristics, or the housing 10 has a shape that changes its water-contact characteristics or is at least subjected to the surface treatment. In the first embodiment, the lens 20 is at least partially subjected to the surface treatment that changes its water-contact characteristics.

The term "surface treatment that changes waver-contact characteristics" as used herein includes a surface treatment that changes a water-contact angle of a solid surface or a treatment that changes a water-slide angle of the solid surface. In the present disclosure, the water-contact angle and the water-slide angle of the solid surface are appropriately adjusted to respective particular values demonstrated in the present disclosure by subjecting the solid surface to the surface treatment. The surface treatment in the present disclosure includes surface coating or surface modification. The surface treatment may be applied on an existing coating such as an antireflection film. In the present disclosure, being subjected to the surface treatment has the same meaning as having a surface coating or a surface-modified layer.

The term "surface treatment that changes waver-contact characteristics" as used herein can include any surface treatment. It is known that, in general, in a case in which a solid surface has a fine uneven structure, a surface having high hydrophilicity has higher hydrophilicity and a surface having high water repellency has higher water repellency. Thus, a surface having a particularly high hydrophilicity can be formed by subjecting a highly hydrophilic material to a surface modification process to produce a fine uneven structure. As a method for adjusting the fine uneven structure, a method for forming a fractal structure surface by self-organization, a method using laser ablation, a method using microwave plasma CVD, a method using etching with a corrosive fluid, or the like may be employed. As the material having high hydrophilicity, a titanium oxide film coating agent, a silicone resin in which a silanol group is oriented, or the like can be used. Alternatively, a glass material can be used as the material having high hydrophilicity. The property of a solid surface having particularly high hydrophilicity is also called superhydrophilicity. Similarly, a surface having particularly high water repellency can be formed by subjecting a material having high water repellency to a surface modification for generating a fine uneven structure. As the material having high water repellency, a fluorine compound having a trifluoromethyl group, a silicone resin in which a hydrophobic methyl group is oriented, or the like can be used. The property of a solid surface having particularly high water repellency is also called super water repellency. Further, it is known that a solid surface having a structure in a predetermined shape has high slidability. Thus, as a process to adjust the water-slide angle, the surface modification mentioned above can be used to form a structure in the predetermined shape in the solid surface. Further, other known methods can be used to appropriately adjust the hydrophilicity, the water repellency, and the slidability of the solid surface.

The housing 10 supports the lens 20. The housing 10 includes a side surface portion 11, a front surface portion 12, and a support portion 13, as illustrated in FIG. 3.

The side surface portion 11 may have a tubular shape, as illustrated in FIG. 3. The inside the side surface portion 11 can be sealed by, for example, a seal or the like arranged between the side surface portion 11 and the lens 20. The side surface portion 11 encloses various elements for realizing functions of the vehicle-mounted camera 1. For example, an imaging circuit 15 is arranged inside the side surface portion 11, as illustrated in FIG. 3. A diaphragm, an infrared cut filter, or the like may also be arranged inside the side surface portion 11, in addition to the imaging circuit 15. The side surface portion 11 is located around the front surface portion 12.

As illustrated in FIG. 3, a portion of the lens 20 is exposed from the front surface portion 12. The front surface portion 12 may be integrally formed with the side surface portion 11.

The support portion 13 supports the lens 20. The support portion 13 is also referred to as a retainer. The support portion 13 includes an inner wall 14 surrounding the side surface 23 of the lens 20. A clearance is provided between the inner wall 14 and the side surface 23 of the lens 20.

The imaging circuit 15 includes an image sensor. The image sensor has a plurality of pixels arranged in two dimensions. The image sensor may include, for example, a CCD (Charge Coupled Device) image sensor or a CMOS (Complementary Metal Oxide Semiconductor) image sensor. The imaging circuit 15 captures a subject image formed by the image sensor and generates a captured image. The imaging circuit 15 outputs the captured image thus generated to the outside of the vehicle-mounted camera 1.

The lens 20 is arranged closest to a subject side, among lenses included in the vehicle-mounted camera 1. The lens 20 forms the subject image on the imaging circuit 15 enclosed in the side surface portion 11. The lens 20 has a first surface 21 and a second surface 22, as illustrated in FIG. 3. Further, the lens 20 has a side surface 23 provided around the first surface 21. The side surface 23 is located around the first surface 21.

The first surface 21 opposes the subject side. The first surface 21 protrudes from the front surface portion 12 of the housing 10, as illustrated in FIG. 3. There may be a case in which water droplets such as rainwater or foreign matters are attached to the first surface 21. Rainwater or the like attached to the first surface 21 may deteriorate the quality of the captured image by the vehicle-mounted camera 1.

The second surface 22 opposes in a direction opposite from the subject. In other words, the second surface 22 opposes the inside of the side surface portion 11. As described above, the inside of the side surface portion 11 can be sealed. Thus, when the imaging circuit 15 or the like enclosed in the side surface portion 11 generates heat, water vapor may be generated in the side surface portion 11. In a state in which water vapor is generated in the side surface portion 11, when the temperature of the second surface 22 is reduced by, for example, cold air blown to the first surface 21, water droplets may be attach to the second surface 22. When the lens 20 is fogged due to water droplets attached to the second surface 22, the quality of the captured image by the vehicle-mounted camera 1 may be deteriorated.

Here, to prevent the situation described above, in the first embodiment at least one of the first surface 21 and the second surface 22 is subjected to the surface treatment that changes the characteristics of the water-contact angle described above. By performing such a surface treatment, in the first embodiment the value such as the water-contact angle of the first surface 21 is appropriately adjusted to values described in the following example configurations. In the first embodiment, by appropriately adjusting the value such as the water-contact angle of the first surface 21, the quality of the captured image by the vehicle-mounted camera 1 can be improved, as will be described in the following example configurations.

Example Configuration 1

The water-contact angle of the first surface 21 may be smaller than 5 degrees, and the water-slide angle of the first surface 21 may be smaller than 10 degrees. In a case in which the water-contact angle of the first surface 21 is smaller than 5 degrees, when, for example, water droplets such as rainwater are attached to the first surface 21, the water droplets wet the first surface 21 and spread thereon. Because water droplets wet the first surface 21 and spread thereon, when a foreign substance is attached to the first surface 21, the water droplets can penetrate between the foreign substance attached to the first surface 21 and the first surface 21. Further, in a case in which the water-slide angle of the first surface 21 is smaller than 10 degrees, the water droplets having penetrated between the first surface 21 and the foreign matter can slide down on the first surface 21 together with the foreign matter. In a case in which the water-slide angle of the first surface 21 is smaller than 10 degrees, when a foreign matter is not attached to the first surface 21, water droplets such as rainwater attached to the first surface 21 can slide down on the first surface 21. This configuration can remove water droplets such as rainwater and a foreign matter attached to the first surface 21. Thus, the quality of the captured image by the vehicle-mounted camera 1 can be improved.

Example Configuration 2

The water-contact angle of the first surface 21 may exceed 105 degrees, and the water-slide angle of the first surface 21 may be smaller than 10 degrees. In a case in which the water-contact angle of the first surface 21 exceeds 105 degrees, water droplets such as rainwater are less likely to attach to the first surface 21. Further, in a case in which the water-slide angle of the first surface 21 is smaller than 10 degrees, when water droplets such as rainwater are attached to the first surface 21, the water droplets can slide down on the first surface 21. That is, this configuration can suppress water droplets from attaching to the first surface 21. This configuration can improve the quality by the captured image by the vehicle-mounted camera 1.

Example Configuration 3

The water-contact angle of the first surface 21 may be smaller than 5 degrees, and the water-contact angle of the second surface 22 may be smaller than 5 degrees. In a case in which the water-contact angle of the first surface 21 is smaller than 5 degrees, when, for example, water droplets such as rainwater are attached to the first surface 21, the water droplets wet the first surface 21 and spread thereon. Because the water droplets wet the first surface 21 and spread thereon, the water droplets on the first surface 21 can be suppressed from being reflected in the captured image by the vehicle-mounted camera 1. Further, in a case in which the water-contact angle of the second surface 22 is smaller than 5 degrees, when water droplets are attached to the second surface 22, the water droplets wet the second surface 22 and spread thereon. Because the water droplets wet the second surface 22 and spread thereon, the water droplets on the second surface 22 can be suppressed from being reflected in the captured image by the vehicle-mounted camera 1. This configuration can improve the quality of the captured image by the vehicle-mounted camera 1.

Example Configuration 4

The water-contact angle of the first surface 21 may be smaller than 5 degrees, and the water-slide angle of the second surface 22 may be smaller than 10 degrees. In a case in which the water-contact angle of the first surface 21 is smaller than 5 degrees, water droplets on the first surface 21 can be suppressed from being reflected in the captured image by the vehicle-mounted camera 1 as described above. Further, in a case in which the water-slide angle of the second surface 22 is smaller than 10 degrees, when water droplets are attached to the second surface 22, the water droplets can slide down on the second surface 22. This configuration can improve the quality of the captured image by the vehicle-mounted camera 1.

Example Configuration 5

The water-contact angle of the first surface 21 may exceed 105 degrees, and the water-contact angle of the second surface 22 may be smaller than 5 degrees. In a case in which the water-contact angle of the first surface 21 exceeds 105 degrees, water droplets such as rainwater are less likely to attach to the first surface 21 as described above. Further, in a case in which the water-contact angle of the second surface 22 is smaller than 5 degrees, water droplets are less likely to attach to the second surface 22. This configuration can improve the quality of the captured image by the vehicle-mounted camera 1.

Example Configuration 6

The water-contact angle of the first surface 21 may exceed 105 degrees, and the water-slide angle of the second surface 22 may be smaller than 10 degrees. In a case in which the water-contact angle of the first surface 21 exceeds 105 degrees, water droplets such as rainwater are less likely to attach to the first surface 21 as described above. Further, in a case in which the water-slide angle of the second surface 22 is smaller than 10 degrees, when water droplets are attached to the second surface 22, the water droplets can slide on the second surface 22. This configuration can improve the quality of the captured image by the vehicle-mounted camera 1.

Example Configuration 7

The water-contact angle of the first surface 21 may be smaller than 5 degrees, and the water-slide angle of the first surface 21 may be smaller than 10 degrees. Further, the water-contact angle of the second surface 22 may be smaller than 5 degrees. This configuration can remove water droplets such as rainwater and a foreign substance attached to the first surface 21 as described above and suppress the water droplets on the second surface 22 from reflected in the captured image by the vehicle-mounted camera 1 as described above. Thus, the quality of the captured image by the vehicle-mounted camera 1 can be improved.

Example Configuration 8

The water-contact angle of the first surface 21 may be smaller than 5 degrees, and the water-slide angle of the first surface 21 may be smaller than 10 degrees. Further, the water-slide angle of the second surface 22 may be smaller than 10 degrees. This configuration can remove water droplets such as rainwater and a foreign substance attached to the first surface 21 as described above and also cause the water droplets to slide down on the second surface 22 as described above. Thus, the quality of the captured image by the vehicle-mounted camera 1 can be improved.

Example Configuration 9

The water-contact angle of the first surface 21 may exceed 105 degrees, and the water-slide angle of the first surface 21 may be smaller than 10 degrees. Further, the water-contact angle of the second surface 22 may be smaller than 5 degrees. This configuration can suppress water droplets such as rainwater and a foreign substance from attaching to the first surface 21 as described above and also suppress the water droplets on the second surface 22 from being reflected in the captured image by the vehicle-mounted camera 1 as described above. Thus, the quality of the captured image by the vehicle-mounted camera 1 can be improved.

Example Configuration 10

The water-contact angle of the first surface 21 may exceed 105 degrees, and the water-slide angle of the first surface 21 may be smaller than 10 degrees. Further, the water-slide angle of the second surface 22 may be smaller than 10 degrees. This configuration can suppress water droplets from attaching to the first surface 21 as described above and cause water droplets attached to the second surface 22 to slide down thereon. Thus, the quality of the captured image by the vehicle-mounted camera 1 can be improved.

According to the first embodiment, as described above, at least one of the first surface 21 and the second surface 22 of the lens 20 is subjected to the surface treatment that changes the water-contact characteristics. This configuration can improve the quality of the captured image by the vehicle-mounted camera 1, as described above. According to the first embodiment, thus, the vehicle-mounted camera 1 that can improve the quality of the captured image can be provided.

Second Embodiment

In a second embodiment, the surface treatment for changing the water-contact characteristics described above is applied to the first surface 21 of the lens 20 such that the water-contact characteristics is changed in a portion of the first surface 21. In the second embodiment, in particular, a water-contact angle of a predetermined region of the first surface 21 is larger than a water-contact angle of a region of the first surface 21 other than the predetermined region. The predetermined region is a region associated with the captured image by the vehicle-mounted camera 1. Hereinafter, an example of this configuration will be described.

Figure 4:
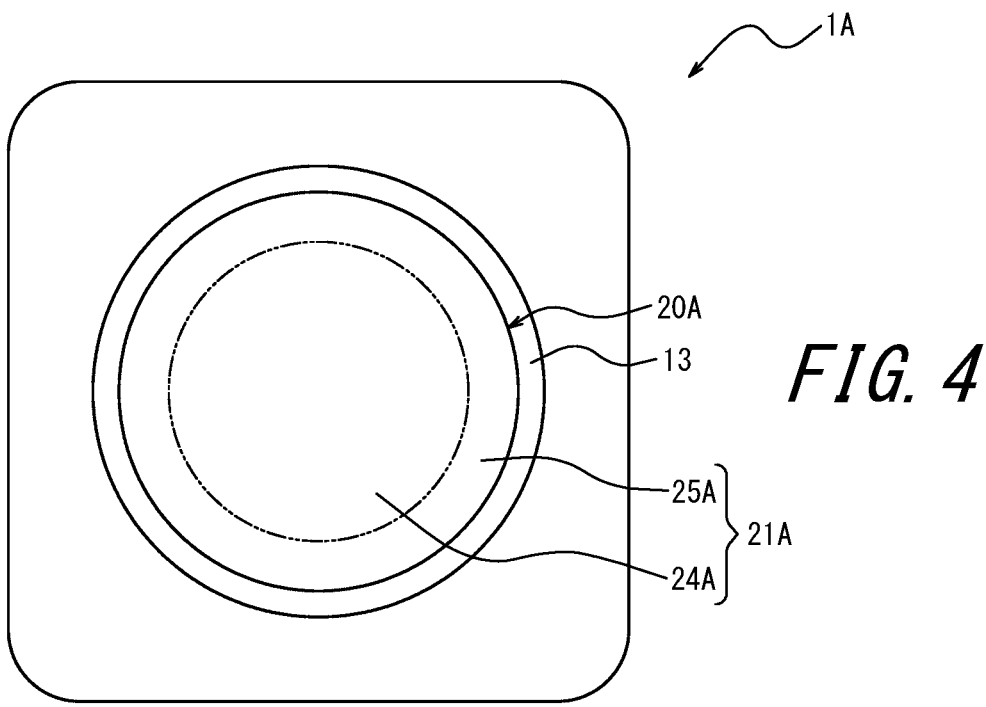
FIG. 4 is an elevation view of a vehicle-mounted camera according to a second embodiment of the present disclosure.

FIG. 4 is an elevation view of a vehicle-mounted camera 1A according to the second embodiment of the present disclosure. The vehicle-mounted camera 1A includes a lens 20A. The lens 20A includes a predetermined region 24A and an outer peripheral region 25A. The predetermined region 24A is a region corresponding to an effective diameter of the lens 20A. The outer peripheral region 25A is a region of the lens 20A other than the predetermined region 24A.

A water-contact angle of the predetermined region 24A is larger than a water-contact angle of the outer peripheral region 25A. In other words, the hydrophilicity of the outer peripheral region 25A is higher than the hydrophilicity of the predetermined region 24A. This configuration enables water droplets such as rainwater attached to the predetermined region 24A to be discharged to the outer peripheral region 25A having higher hydrophilicity than the predetermined region 24A. By discharging water droplets such as rainwater attached to the predetermined region 24A to the outer peripheral region 25A, the water droplets can be suppressed from being reflected in the captured image by the vehicle-mounted camera 1.

The water-contact angle of the predetermined region 24A may exceed 105 degrees. In other words, the predetermined region 24A may have super water repellency. This configuration suppresses water droplets such as rainwater from attaching to the predetermined region 24A. Thus, water droplets can be further suppressed from being reflected in the captured image by the vehicle-mounted camera 1.

A difference between the water-contact angle of the predetermined region 24A and the water-contact angle of the outer peripheral region 25A may be large. For example, the water-contact angle of the predetermined region 24A may exceed 150, and the water-contact angle of the outer peripheral region 25A may be smaller than 5 degrees. In other words, the predetermined region 24A may have super water repellency, and the outer peripheral region 25 may have superhydrophilicity. This configuration can further enable water droplets such as rainwater attached to the predetermined region 24A to be discharged to the outer peripheral region 25A. Thus, water droplets can be further suppressed from being reflected in the captured image by the vehicle-mounted camera 1.

Another Example Configuration

Figure 5:
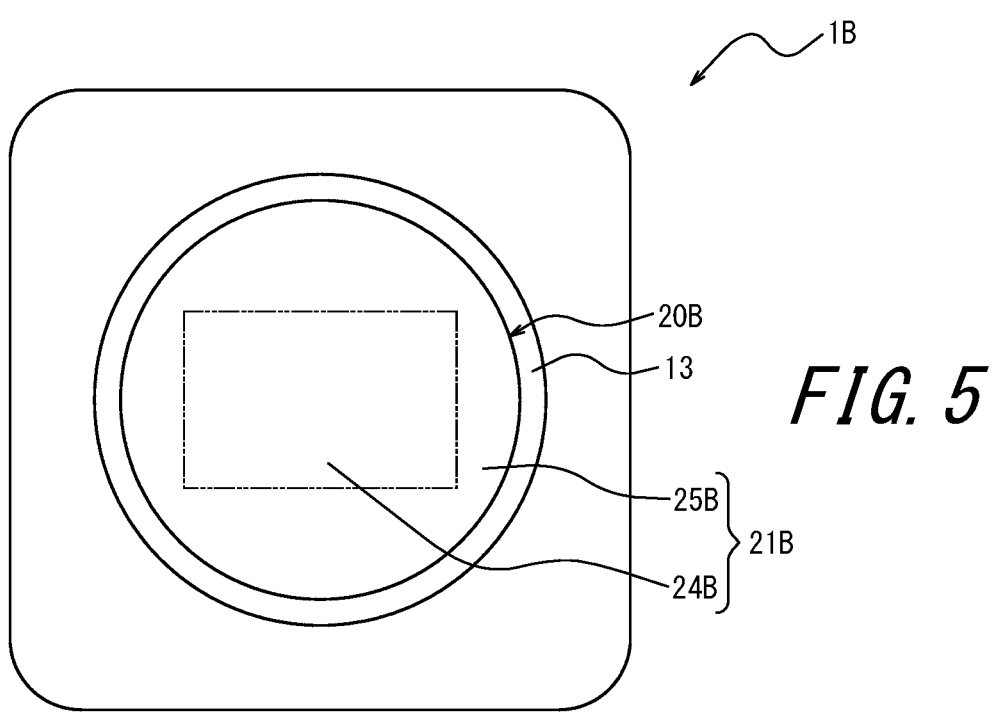
FIG. 5 is an elevation view of a vehicle-mounted camera according to another example configuration of the second embodiment of the present disclosure.

FIG. 5 is an elevation view of a vehicle-mounted camera 1B according to another example configuration of the second embodiment of the present disclosure. The vehicle-mounted camera 1B includes a lens 20B. The lens 20B includes a predetermined region 24B and an outer peripheral region 25B. The predetermined region 24B is a region corresponding to an imaging region. The imaging region depends on a configuration of an image sensor and the like included in the imaging circuit 15 illustrated in FIG. 3. For example, the imaging region has a substantially rectangular shape in the elevation view illustrated in FIG. 5. The outer peripheral region 25B is a region of the lens 20B other than the predetermined region 24B.

A water-contact angle of the predetermined region 24B is smaller than a water-contact angle of the outer peripheral region 25B, in a manner similar to the configuration illustrated in FIG. 4. This configuration can suppress water droplets from being reflected in the captured image by the vehicle-mounted camera 1, as described above.

The water-contact angle of the predetermined region 24B may exceed 105 degrees, in a manner similar to the configuration illustrated in FIG. 4. This configuration can further suppress water droplets from being reflected in the captured image by the vehicle-mounted camera 1, in a manner similar to the above description.

A difference between the water-contact angle of the predetermined region 24B and the water-contact angle of the outer peripheral region 25B may be large, in a manner similar to the configuration illustrated in FIG. 4. For example, the water-contact angle of the predetermined region 24B may exceed 150, and the water-contact angle of the outer peripheral region 25B may be smaller than 5 degrees, in a manner similar to the configuration illustrated in FIG. 4. Thus, water droplets can be further suppressed from being reflected in the captured image by the vehicle-mounted camera 1, in a manner similar to the above description.

In the vehicle-mounted cameras 1A and 1B according to the second embodiment, as described above, the water-contact angles of the predetermined regions 24A and 24B of the first surfaces 21A and 21B of the lens 20 are smaller than the water-contact angles of the outer peripheral regions 25A and 25B. This configuration can suppress water droplets from being reflected in the captured images of the vehicle-mounted cameras 1A and 1B, as described above. According to the second embodiment, thus, the vehicle-mounted cameras 1A and 1B that improve the quality of captured images can be provided.

Third Embodiment

Figure 6:
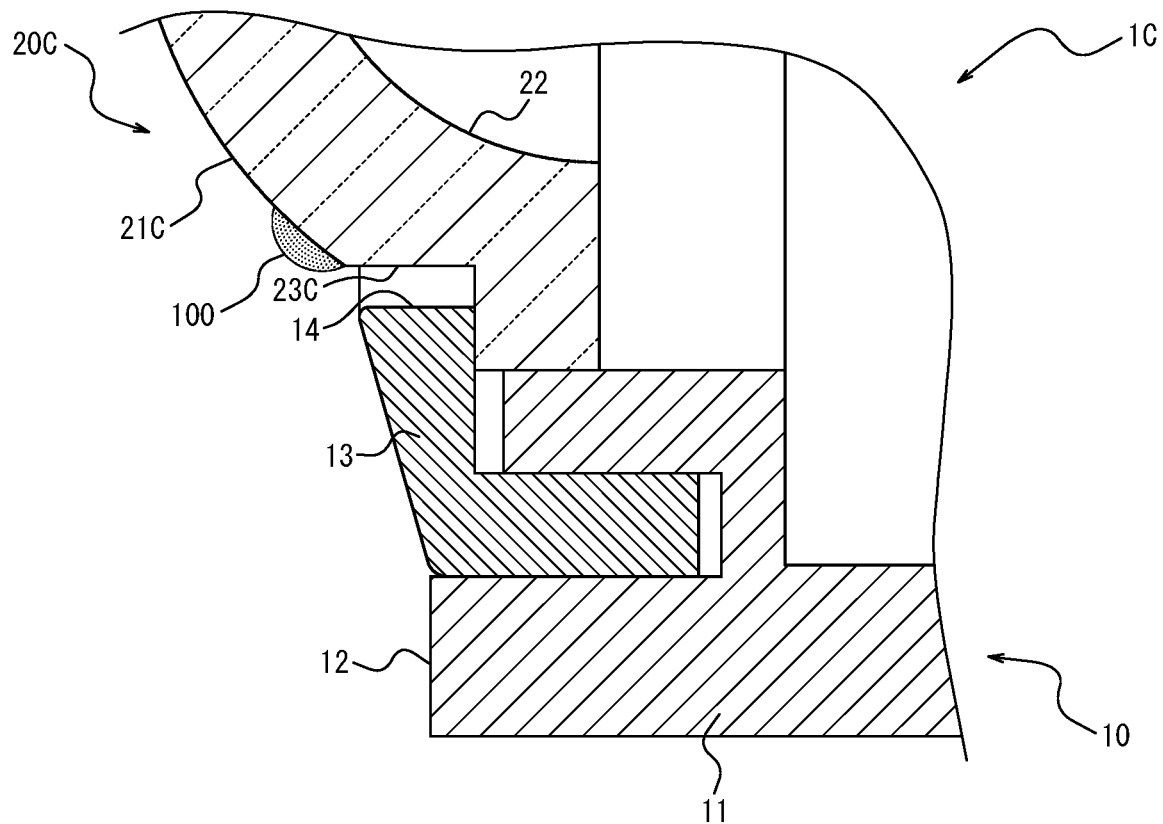
FIG. 6 is a partial cross-sectional view of a vehicle-mounted camera according to a third embodiment of the present disclosure.

FIG. 6 is a cross-sectional view of a vehicle-mounted camera 1C according to a third embodiment of the present disclosure. FIG. 6 corresponds to a partially enlarged view of the cross-sectional view illustrated in FIG. 3.

The vehicle-mounted camera 1C includes a lens 20C. In the third embodiment, water-contact characteristics of a side surface 23C of the lens 20C are changed by the surface treatment described above that changes the water-contact characteristic.

In particular, a water-contact angle of the side surface 23C is smaller than a water-contact angle of the first surface 21C. In other words, the hydrophilicity of the side surface 23C is higher than the hydrophilicity of the first surface 21C. This configuration enables a water droplet 100 that has slid down to a lower end portion of the first surface 21C to flow to the side surface 23C. When the water droplet 100 flows to the side surface 23C, the water droplet 100 can flow to a clearance between the side surface 23C and the inner wall 14 of the support portion 13. Thus, the water droplets can be suppressed from staying in the lower end portion of the first surface 21C, and the water droplets attached to the first surface 21C can be removed. By removing the water droplets attached to the first surface 21C, the water droplets are suppressed from being reflected in the captured image by the vehicle-mounted camera 1.

A water-contact angle of a portion of the side surface 23C may be smaller than the water-contact angle of the first surface 21C. For example, in the side surface 23C surrounding the circumference of the first surface 21C, the water-contact angle of a portion near the lower end portion of the first surface 21C may be smaller than the water-contact angle of the first surface 21C.

The water-contact angle of the entire side surface 23C may be smaller than the water-contact angle of the first surface 21C. This configuration enables, when the lens 20C is incorporated into the housing 10, the side surface 23C in its entirety to be positioned under the lens 20. This facilitates an assembly process of the vehicle-mounted camera 1C.

In addition to the side surface 23C, a water-contact angle of the inner wall 14 of the support portion 13 may be smaller than the water-contact angle of the first surface 21C. This configuration further facilitates the flow of the water droplet 100 having slid down to the lower end portion of the first surface 21C to the clearance between the side surface 23C and the inner wall 14 of the support portion 13.

In the vehicle-mounted camera 1C according to the third embodiment, as described above, the water-contact angle of the side surface 23C is smaller than the water-contact angle of the first surface 21C. This configuration can remove water droplets attached to the first surface 21C of the lens 20C as described above and suppress the water droplets from being reflected in the captured image by the vehicle-mounted camera 1. According to the third embodiment, thus, the vehicle-mounted camera 1C that improves the quality of the captured image can be provided.

Fourth Embodiment

A general vehicle-mounted camera includes a housing having a substantially square prism shape or a substantially cylindrical shape. A housing having the substantially square prism shape has a substantially quadrangular front surface portion from which a portion of a lens is exposed. A housing having a substantially cylindrical shape has a substantially circular front surface portion from which a portion of a lens is exposed. Here, in some cases the vehicle-mounted camera is installed at a depression angle of, for example, 30 to 60 degrees. That is, the vehicle-mounted camera may take an inclined posture with respect to the ground. When the general vehicle-mounted camera described above takes an inclined posture with respect to the ground, a substantially flat portion included in the front surface portion described above opposes the ground, and thus water droplets may accumulate in the substantially flat portion. That is, when a general vehicle-mounted camera takes an inclined posture with respect to the ground, water droplets may accumulate in the front surface portion where a part of the lens is exposed. When water droplets accumulate in the front surface portion where a part of the lens is exposed as described above, the water droplets can be reflected in a captured image by the vehicle-mounted camera and deteriorate the quality of the captured image.

As such, to prevent the situation described above, the housing 10 has at least a shape that changes its water-contact characteristics or is at least subjected to a surface treatment that changes the water-contact characteristics in a fourth embodiment, as will be described below. In the fourth embodiment, thus, the quality of the captured image is improved, as will be described below.

Figure 7:
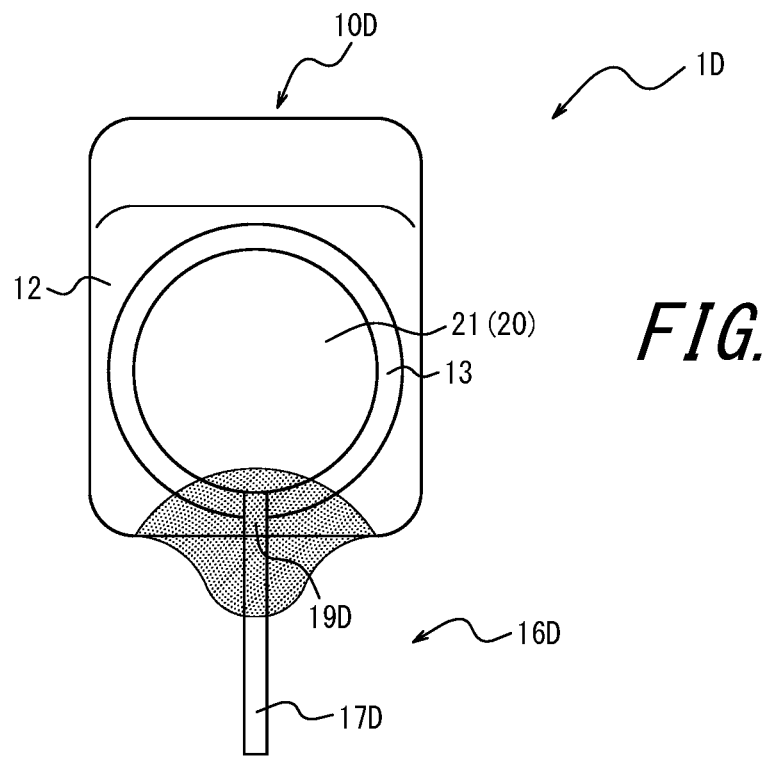
FIG. 7 is a front perspective view of a vehicle-mounted camera according to a fourth embodiment of the present disclosure.
Figure 8:
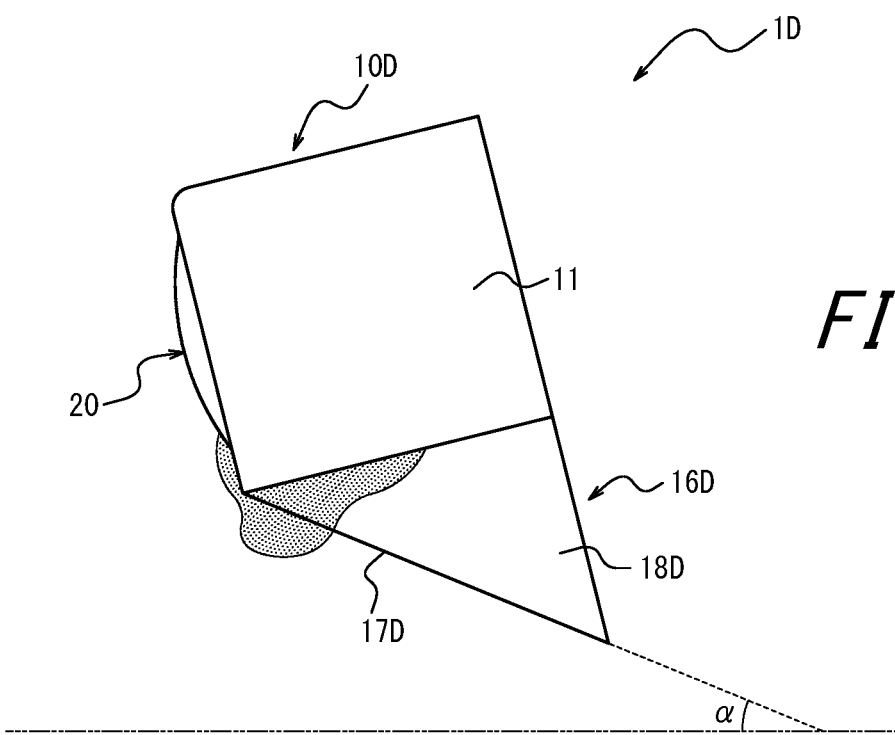
FIG. 8 is a side view of the vehicle-mounted camera illustrated in FIG. 7.

FIG. 7 is a front perspective view of a vehicle-mounted camera 1D according to the fourth embodiment of the present disclosure. FIG. 8 is a side view of the vehicle-mounted camera 1D illustrated in FIG. 7. In FIG. 8, the two-dot chain line indicates a plane horizontal to the ground.

The vehicle-mounted camera 1D is installed at a depression angle of, for example, 30 to 60 degrees. Thus, the vehicle-mounted camera 1D takes an inclined posture with respect to the ground, as illustrated in FIG. 8.

The vehicle-mounted camera 1D includes a lens 20 and a housing 10D, as illustrated in FIG. 7. The housing 10D has a side surface portion 11, a front surface portion 12 from which a portion of the lens 20 is exposed, and the support portion 13. The vehicle-mounted camera 1D further includes a water guide portion 16D that has a slope 17D and side surfaces 18D, as illustrated in FIG. 7 and FIG. 8. The housing 10D may further include a connection portion 19D, as illustrated in FIG. 7.

As illustrated in FIG. 8, the slope 17D extends from under the lens 20, that is, from a lower end portion of the front surface portion 12 toward the ground in a manner inclined with respect to the ground. The slope 17D may extend from the lower end portion of the front surface portion 12 in a direction opposite from the direction in which a subject is present, with respect to the horizontal direction. This configuration facilitates the flow of water droplets having been slid down to the bottom of the lens 20 to the slope 17D. This configuration can suppress the water droplets from accumulating on the bottom of the lens 20. Thus, the quality of the captured image by the vehicle-mounted camera 1 can be improved.

An angle α formed by the slope 17D and the ground as illustrated in FIG. 8 may be large. The larger the angle α, the easier for the water droplets having slid down on the first surface 21 to under the lens 20 to flow to the slope 17D.

A water-contact angle of the slope 17D may be smaller than a water-contact angle of the lower end portion of the first surface 21. This configuration further facilitates the flow of the water droplets having slid down to the bottom of the lens 20 to the slope 17D. Note that, in the slope 17D, the water-contact angle of the lower end portion of the front surface portion 12 may be smaller than the water-contact angle of the lower end portion of the first surface 21.

The water-slide angle of the slope 17D may be smaller than 10 degrees. This configuration enables water droplets having flown to the slope 17D to slide down on the slope 17D more smoothly. Thus, a discharging function of the slope 17D with respect to water droplets can be improved, whereby the water droplets having slid down on the first surface 21 to the bottom of the lens 20 more easily flow to the slope 17D.

The side surfaces 18D are provided on both side portions of the water guide portion 16D having the slope 17D therebetween. In a manner similar to the slope 17D, a water-contact angle of the side surfaces 18D may be smaller than the water-contact angle of the lower end portion of the first surface 21. In a manner similar to the slope 17D, further, a water-contact angle of respective portions of the side surfaces 18D near the lower end portion of the front surface portion 12 may be smaller than the water-contact angle of the lower end portion of the first surface 21.

The connection portion 19D connects a lower end portion of the outer surface of the lens 20, that is, the lower end portion of the first surface 21, and the slope 17D. A water-contact angle of the outer surface of the connection portion 19D is smaller than the water-contact angle of the lower end portion of the first surface 21. This configuration facilitates the flow of the water droplets having slid down on the first surface 21 and accumulated on the bottom the lens 20 to the connection portion 19D. Thus, the water droplets having slid down to the bottom of the lens 20 more easily flow to the slope 17D.

A water-slide angle of the outer surface of the connection portion 19D may be smaller than 10 degrees. This configuration further facilitates the flow of water droplets having slid down to the bottom of the lens 20 to the slope 17D via the connection portion 19D.

Another Example Configuration 1

Figure 9:
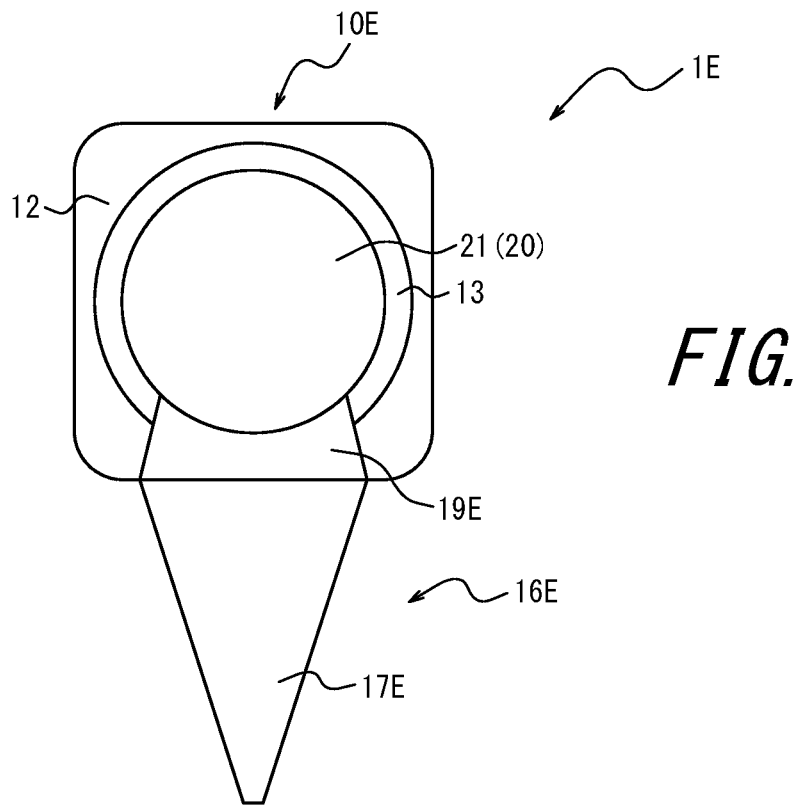
FIG. 9 is a front perspective view of a vehicle-mounted camera according to another example configuration 1 of the fourth embodiment of the present disclosure.
Figure 10:
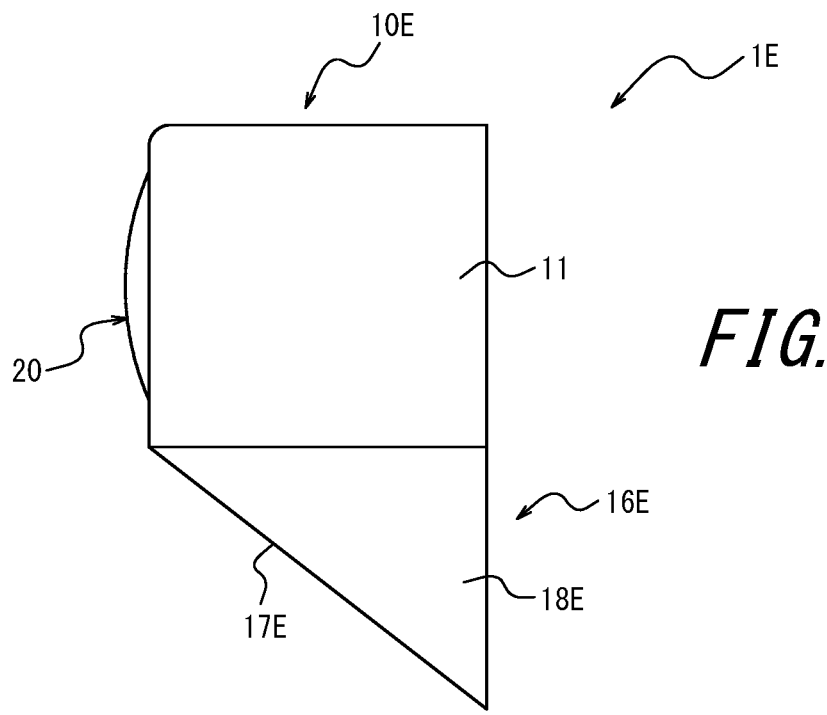
FIG. 10 is a side view of the vehicle-mounted camera illustrated in FIG. 9.

FIG. 9 is a front perspective view of a vehicle-mounted camera 1E according to another example configuration 1 of the fourth embodiment of the present disclosure. FIG. 10 is a side view of the vehicle-mounted camera 1E illustrated in FIG. 9.

The vehicle-mounted camera 1E includes a housing 10E, as illustrated in FIG. 9 and FIG. 10. The housing 10E includes a water guide portion 16E that has a slope 17E and side surfaces 18E. The housing 10E may further include a connection portion 19F.

As illustrated in FIG. 9, a width of the slope 17E decreases as its distance from the lens 20 increases. This configuration facilitates the falling of the water droplets having flown to the slope 17E to the ground from a tip of the slope 17E positioned on a ground side.

A water-contact angle of the slope 17E may be smaller than the water-contact angle of the lower end portion of the first surface 21, in a manner similar to the configuration illustrated in FIG. 7. Further, the water-slide angle of the slope 17E may be smaller than 10 degrees, in a manner similar to the configuration illustrated in FIG. 7.

The side surfaces 18E are provided to both side portions of the water guide portion 16E having the slope 17E therebetween. The water-contact angle of the side surfaces 18E may be smaller than the water-contact angle of the lower end portion of the first surface 21, in a manner similar to the slope 17E. Further, a water-contact angle of respective portions of the side surfaces 18E near the lower end portion of the front surface portion 12 may be smaller than the water-contact angle of the lower end portion of the first surface 21, in a manner similar to the slope 17E.

A connection portion 19E connects the lower end portion of the outer surface of the lens 20, that is, the lower end portion of the first surface 21, and the slope 17E, in a manner similar to the configuration illustrated in FIG. 7. A water-contact angle of an outer surface of the connection portion 19E is smaller than the water-contact angle of the lower end portion of the first surface 21. This configuration further facilitates the flow of the water droplets having slid down to the bottom of the lens 20 to the slope 17E.

A width of the connection portion 19E gradually increases to the slope 17E from the lower end portion of the first surface 21. This configuration increases a connection width between the connection portion 19E and the slope 17E. Thus, the water droplets having slid down to the connection portion 19E more easily flow to the slope 17E.

The water-slide angle of the outer surface of the connection portion 19E may be smaller than 10 degrees, in a manner similar to the configuration illustrated in FIG. 7.

Other configurations and effects of the vehicle-mounted camera 1E illustrated in FIG. 9 and FIG. 10 are similar to those of the vehicle-mounted camera 1D illustrated in FIG. 7 and FIG. 8.

Another Example Configuration 2

Figure 11:
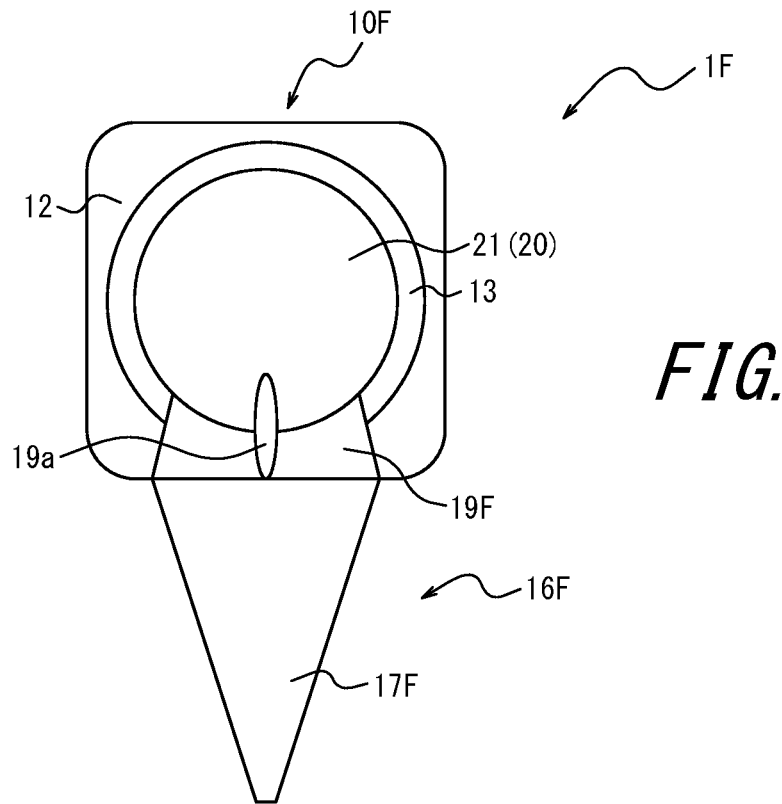
FIG. 11 is a front perspective view of a vehicle-mounted camera according to another example configuration 2 of the fourth embodiment of the present disclosure.
Figure 12:
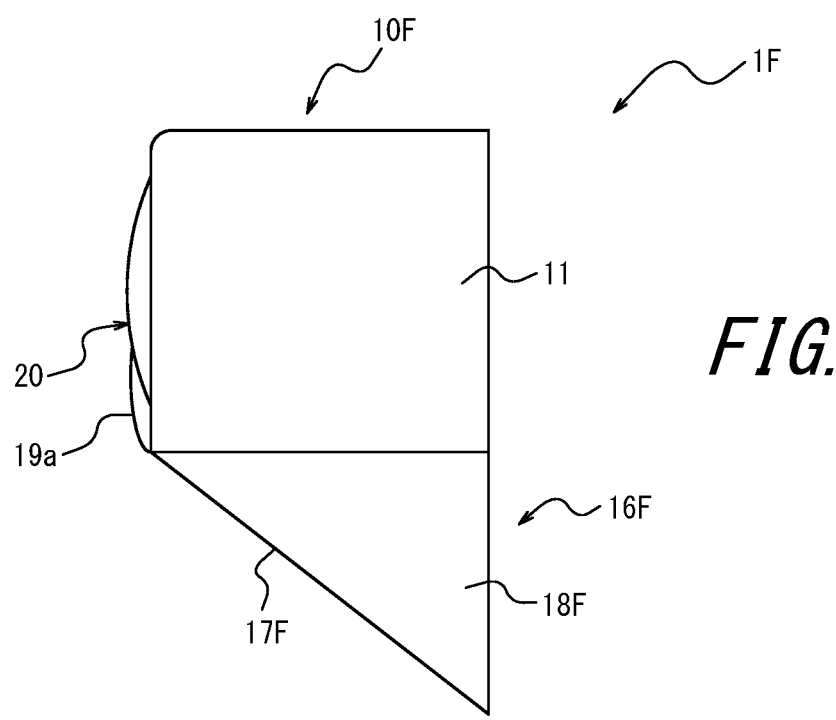
FIG. 12 is a side view of the vehicle-mounted camera illustrated in FIG. 11.

FIG. 11 is a front perspective view of a vehicle-mounted camera 1F according to another example configuration 2 of the fourth embodiment of the present disclosure. FIG. 12 is a side view of the vehicle-mounted camera 1F illustrated in FIG. 11.

The vehicle-mounted camera 1F includes a housing 10F, as illustrated in FIG. 11 and FIG. 12. The housing 10F includes a water guide portion 16F that has a slope 17F and side surfaces 18F. The housing 10F may further include a connection portion 19F and a waterway 19a.

A width of the slope 17F gradually increases to the slope 17 from the lower end portion of the first surface 21, in a manner similar to the slope 17E illustrated in FIG. 9. A width of the connection portion 19F gradually increases to the slope 17F from the lower end portion of the first surface 21, in a manner similar to the connection portion 19E illustrated in FIG. 9.

A water-contact angle of the slope 17F may be smaller than the water-contact angle of the lower end portion of the first surface 21, in a manner similar to the configuration illustrated in FIG. 7. Further, a water-slide angle of the slope 17F may be smaller than 10 degrees, in a manner similar to the configuration illustrated in FIG. 7.

The side surfaces 18F are provided to both side portions of the water guide portion 16F having the slope 17F therebetween. A water-contact angle of the side surfaces 18F may be smaller than the water-contact angle of the lower end portion of the first surface 21, in a manner similar to the slope 17F. Further, the water-contact angle of the respective portions of the side surfaces 18F near the lower end portion of the front surface portion 12 may be smaller than the water-contact angle of the lower end portion of the first surface 21, in a manner similar to the slope 17E.

The connection portion 19F connects the lower end portion of the outer surface of the lens 20, that is, the lower end portion of the first surface 21, and the slope 17F, in a manner similar to the configuration illustrated in FIG. 7. A water-contact angle of the outer surface of the connection portion 19F is smaller than the water-contact angle of the lower end portion of the first surface 21. This configuration further facilitates the flow of the water droplets having slid down to the bottom of the lens 20 to the slope 17F.

The connection portion 19F includes the waterway 19a. The waterway 19a extends from a portion of the first surface 21 to the end portion of the slope 17F. A water-contact angle of the waterway 19a is smaller than the water-contact angle of the first surface 21. Also, a water-slide angle of waterway 19a may be smaller than 10 degrees. This configuration further facilitates the flow of the water droplets having slid down to the bottom of the lens 20 to the slope 17. Thus, the water droplets are further suppressed from attaching to the lens 20.

A water-slide angle of an outer surface of the connection portion 19F may be smaller than 10 degrees, in a manner similar to the configuration illustrated in FIG. 7.

Other configurations and effects of the vehicle-mounted camera 1F illustrated in FIG. 11 and FIG. 12 are similar to those of the vehicle-mounted camera 1D illustrated in FIG. 7 and FIG. 8.

Another Example Configuration 3

Figure 13:
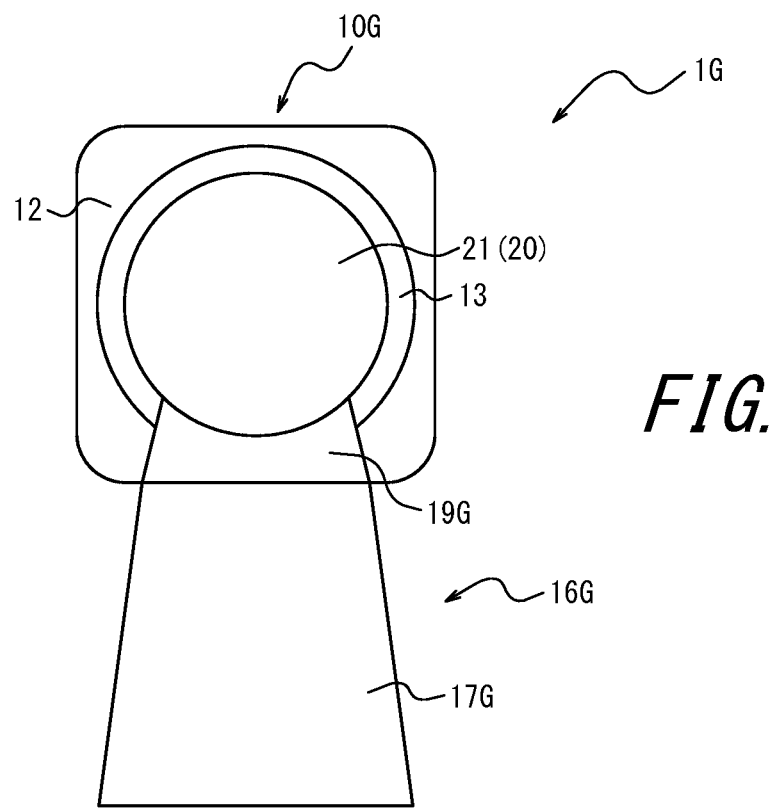
FIG. 13 is a front perspective view of a vehicle-mounted camera according to another example configuration 3 of the fourth embodiment of the present disclosure.
Figure 14:
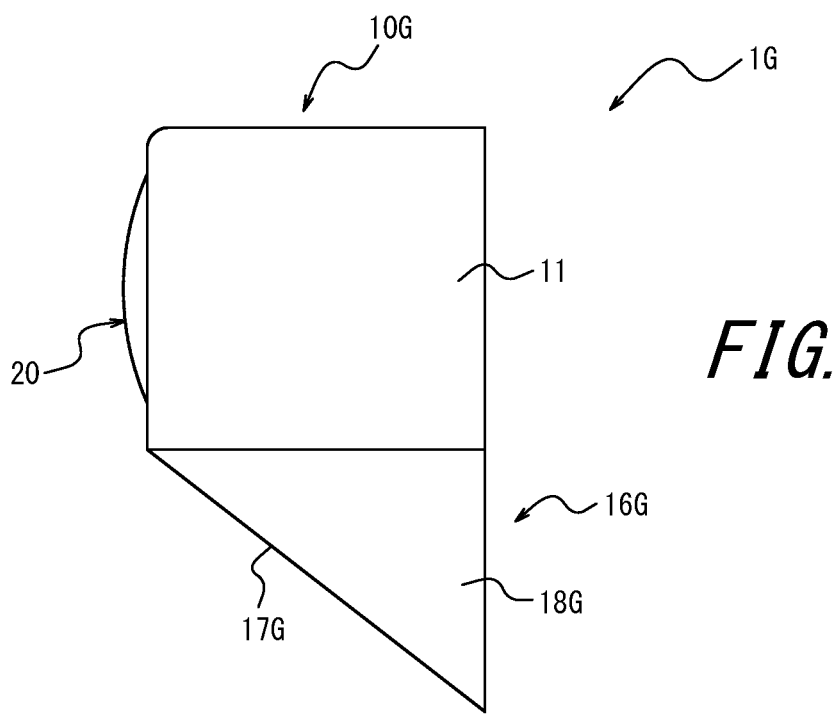
FIG. 14 is a side view of the vehicle-mounted camera illustrated in FIG. 13.

FIG. 13 is a front perspective view of a vehicle-mounted camera 1G according to another example 3 of the fourth embodiment of the present disclosure. FIG. 14 is a side view of the vehicle-mounted camera 1G illustrated in FIG. 13.

The vehicle-mounted camera 1G includes a housing 10G, as illustrated in FIG. 13 and FIG. 14. The housing 10G includes a water guide portion 16G that has a slope 17G and side surfaces 18G. The housing 10G may further include a connection portion 19G.

A width of the slope 17G increases as its distance from the lens 20 increases, as illustrated in FIG. 13. This configuration further facilitates the sliding of the water droplets having flown to the slope 17G thereon. Because the water droplets having flown to the slope 17G can easily slide down on the slope 17G, the water droplets can be further suppressed from attaching to the lens 20.

A water-contact angle of the slope 17G may be smaller than the water-contact angle of the lower end portion of the first surface 21, in a manner similar to the configuration illustrated in FIG. 7. Also, a water-slide angle of the slope 17G may be smaller than 10 degrees, in a manner similar to the configuration illustrated in FIG. 7.

The side surfaces 18G are provided to both side portions of the water guide portion 16G having the slope 17G therebetween. A water-contact angle of the side surfaces 18G may be smaller than the water-contact angle of the lower end portion of the first surface 21, in a manner similar to the slope 17G. Further, a water-contact angle of respective portions of the side surfaces 18G near the lower end portion of the front surface portion 12 may be smaller than the water-contact angle of the lower end portion of the first surface 21, in a manner similar to the slope 17G.

A connection portion 19G connects the lower end portion of the outer surface of the lens 20, that is, the lower end portion of the first surface 21, and the slope 17G, in a manner similar to the configuration illustrated in FIG. 7. A water-contact angle of an outer surface of the connection portion 19G is smaller than the water-contact angle of the lower end portion of the first surface 21. This facilitates the flow of water droplets having slid down to the bottom of the lens 20 to the slope 17G, in a manner similar to the above description.

A width of the connection portion 19G gradually increases to the slope 17G from the lower end portion of the first surface 21, in a manner similar to the connection portion 19E illustrated in FIG. 9. A water-slide angle of the outer surface of the connection portion 19G may be smaller than 10 degrees, in a manner similar to the configuration illustrated in FIG. 7.

Other configurations and effects of the vehicle-mounted camera 1G illustrated in FIG. 13 and FIG. 14 are similar to those of the vehicle-mounted camera 1D illustrated in FIG. 7 and FIG. 8.

Another Example Configuration 4

Figure 15:
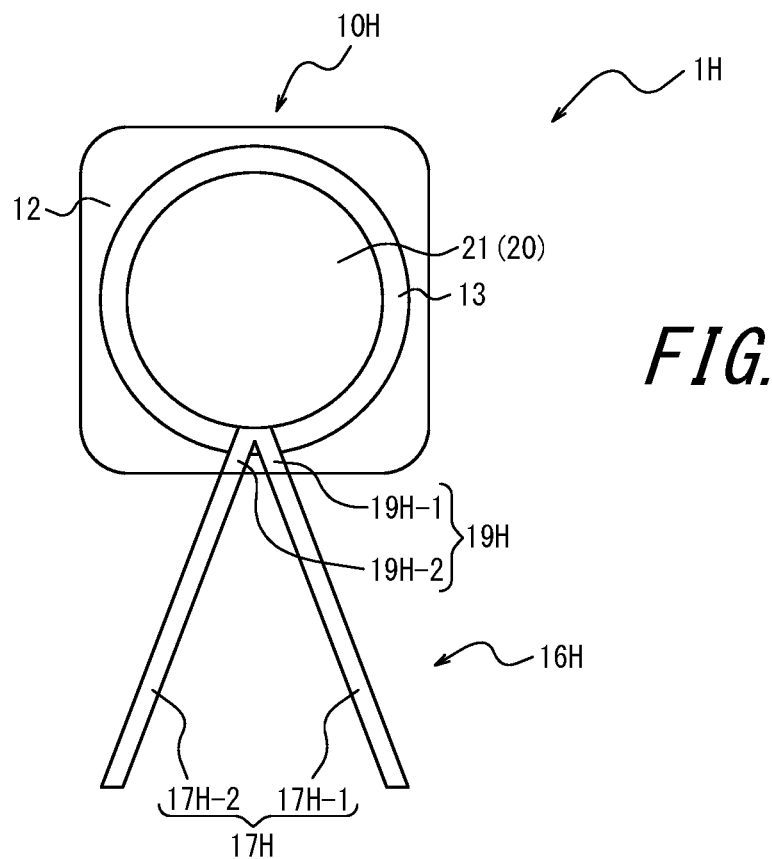
FIG. 15 is a front perspective view of a vehicle-mounted camera according to another example configuration 4 of the fourth embodiment of the present disclosure.
Figure 16:
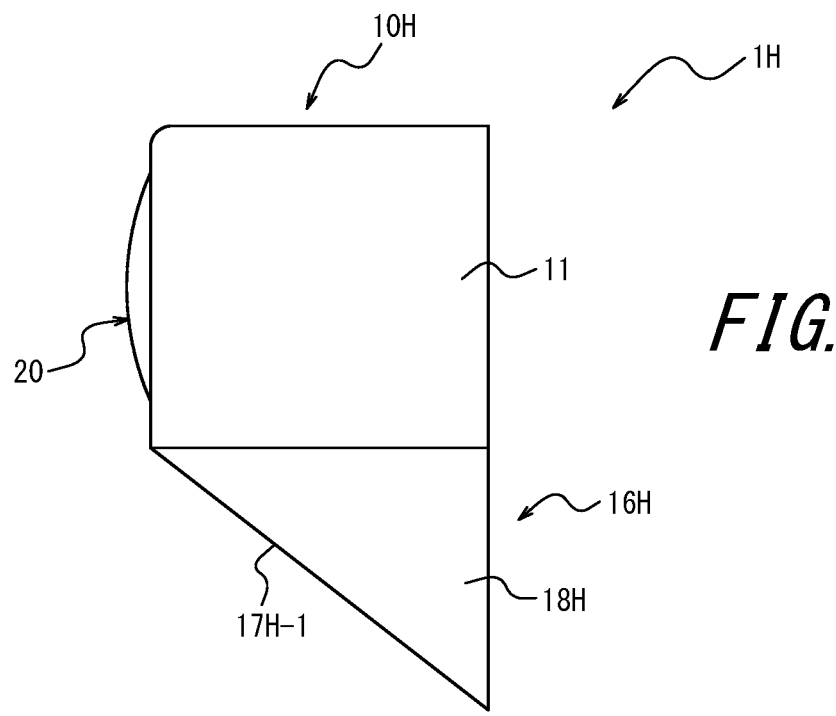
FIG. 16 is a side view of the vehicle-mounted camera illustrated in FIG. 15.

FIG. 15 is a front perspective view of a vehicle-mounted camera 1H according to another example configuration 4 of the fourth embodiment of the present disclosure. FIG. 16 is a side view of the vehicle-mounted camera 1H illustrated in FIG. 15.

The vehicle-mounted camera 1H includes a housing 10H, as illustrated in FIG. 15 and FIG. 16. The housing 10H includes a water guide portion 16H that has a slope 17H and side surfaces 18H. The housing 10H may further include a connection portion 19H.

The slope 17H includes a plurality of branch portions 17H-1 and 17H-2 that are branched. A distance between the branch portion 17H-1 and the branch portion 17H-2 increases as their distances from the lens 20 increases. This configuration facilitates the flow of water droplets to the branch portion 17H-1 or 17H-2 when a mobile body equipped with the vehicle-mounted camera 1H is running in a corner. Thus, the waver droplets can be further suppressed from attaching to the lens 20.

A water-contact angle of outer surfaces of the branch portions 17H-1 and 17H-2 may be smaller than the water-contact angle of the lower end portion of the first surface 21, in a manner similar to the configuration illustrated in FIG. 7. Further, a water-slide angle of the outer surfaces of the branch portions 17H-1 and 17H-2 may be smaller than 10 degrees, in a manner similar to the configuration illustrated in FIG. 7.

The side surfaces 18H are provided to both side portions of the branch portions 17H-1 and 17H-2. A water-contact angle of the side surfaces 18H may be smaller than the water-contact angle of the lower end portion of the first surface 21, in a manner similar to the slope 17H. Further, a water-contact angle of respective portions of the side surfaces 18H near the lower end portion of the front surface portion 12 may be smaller than the water-contact angle of the lower end portion of the first surface 21, in a manner similar to the slope 17H.

The connection portion 19H includes a plurality of branch portions 19H-1 and 19H-2 that are branched. The branch portion 19H-1 connects the lower end portion of the lens 20 and the branch portion 17H-1 of the slope 17H. The branch portion 19H-2 connects the lower end portion of the lens 20 and the branch portion 17H-2 of the slope 17H. A water-contact angle of outer surfaces of the branch portions 19H-1 and 19-2 is smaller than the water-contact angle of the lower end portion of the first surface 21. This configuration facilitates the flow of water droplets having slid down to the bottom of the lens 20 to the branch portions 17H-1 and 17H-2 included in the slope 17H, in a manner similar to the above description. Further, a water-slide angle of the outer surfaces of the branch portions 19H-1 and 19H-2 may be smaller than 10 degrees, in a manner similar to the configuration illustrated in FIG. 7.

Other configurations and effects of the vehicle-mounted camera 1H illustrated in FIG. 15 and FIG. 16 are similar to those of the vehicle-mounted camera 1D illustrated in FIG. 7 and FIG. 8.

In the vehicle-mounted cameras 1D to 1H according to the fourth embodiment, the housings 10D to 10H respectively include the slopes 17D to 17H extending to the ground in an inclined manner with respect to the ground from under the lens 20, as described above. This configuration can suppress water droplets from accumulating under the lens 20 as described above. Thus, the quality of the captured image by the vehicle-mounted camera 1 can be improved. According to the fourth embodiment, thus, the vehicle-mounted cameras 1D to 1H that can improve the quality of the captured images can be provided.

Fifth Embodiment

In the fifth embodiment, the housing 10 has a shape that changes the water-contact characteristics, in a manner similar to the fourth embodiment. Hereinafter, the fifth embodiment will be described.

Figure 17:
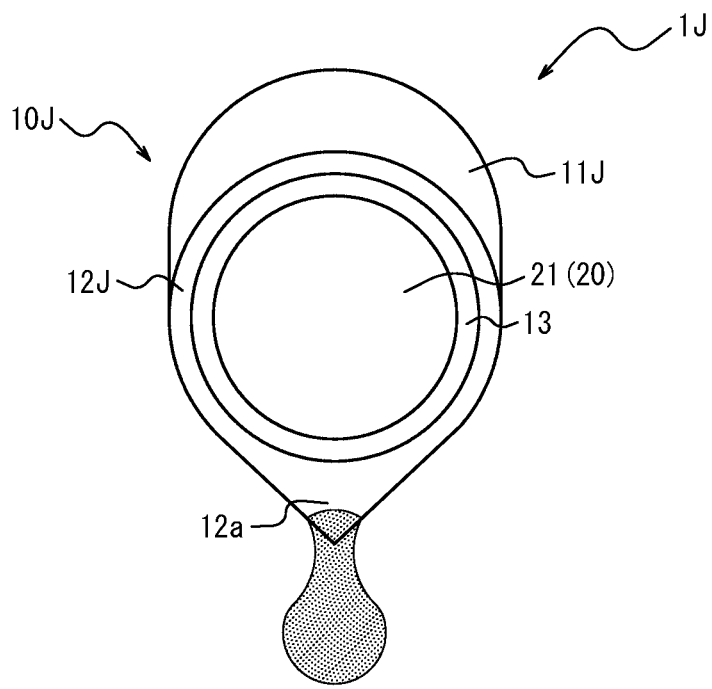
FIG. 17 is a front perspective view of a vehicle-mounted camera according to a fifth embodiment of the present disclosure.
Figure 18:
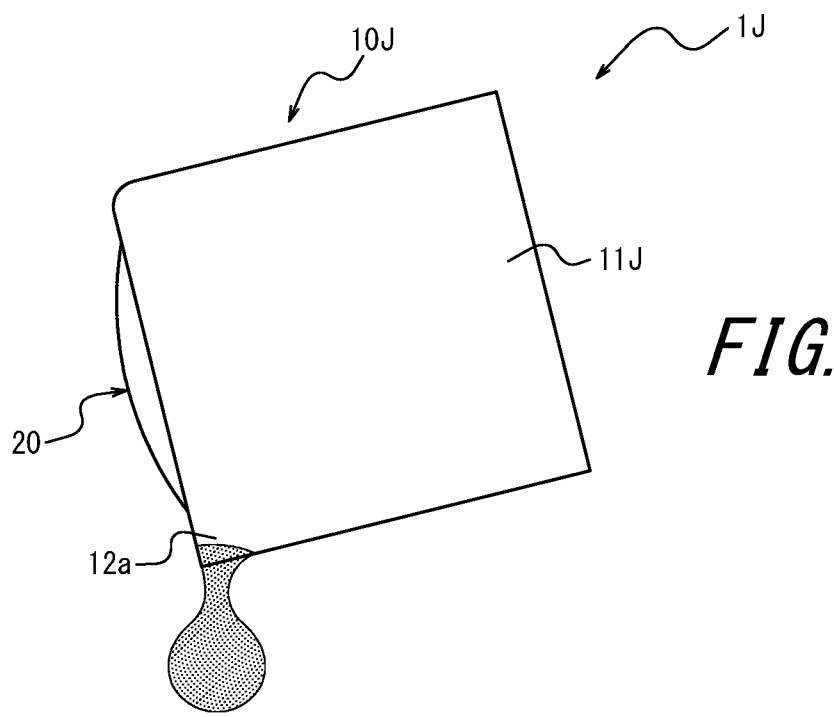
FIG. 18 is a side view of the vehicle-mounted camera illustrated in FIG. 17.

FIG. 17 is a front perspective view of a vehicle-mounted camera 1J according to the fifth embodiment of the present disclosure. FIG. 18 is a side view of the vehicle-mounted camera 1J illustrated in FIG. 17. The two-dot chain line illustrated in FIG. 18 indicates a plane horizontal to the ground.

The vehicle-mounted camera 1J is installed at a depression angle of, for example, 30 to 60 degrees. Thus, the vehicle-mounted camera 1J takes an inclined posture with respect to the ground, as illustrated in FIG. 18.

The vehicle-mounted camera 1J includes a lens 20 and a housing 10J, as illustrated in FIG. 17. The housing 10J includes a side surface portion 11J, a front surface portion 12J, and the support portion 13.

The side surface portion 11J may have a tubular shape. The side surface portion 11J may have a shape corresponding to the shape of the front surface portion 12.

The front surface portion 12J may have an inverted water-drop shape in the elevation view, as illustrated in FIG. 17. A portion of the lens 20 is exposed from the front surface portion 12J, as illustrated in FIG. 17 and FIG. 18. The front surface portion 12J includes at least one corner portion 12a opposing the ground. This configuration enables water droplets having slid down to under the lens 20 to accumulate in the corner portion 12a. Further, water droplets accumulated in the corner portion 12a can fall to the ground. Thus, the water droplets can be suppressed from accumulating on the lens 20. The quality of the captured image by the vehicle-mounted camera 1 can be improved.

Note that the corner portion 12a may have a round shape. For example, a roundness of the corner portion 12a may have a radius of curvature of approximately 2.5 mm.

Another Example Configuration 1

Figure 19:
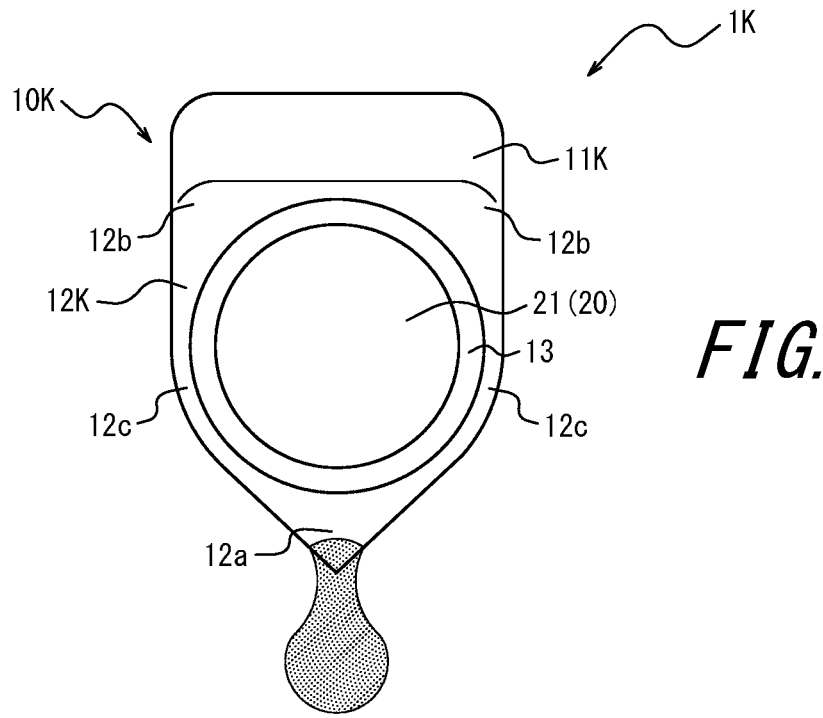
FIG. 19 is a front perspective view of a vehicle-mounted camera according to another example configuration 1 of the fifth embodiment of the present disclosure.
Figure 20:
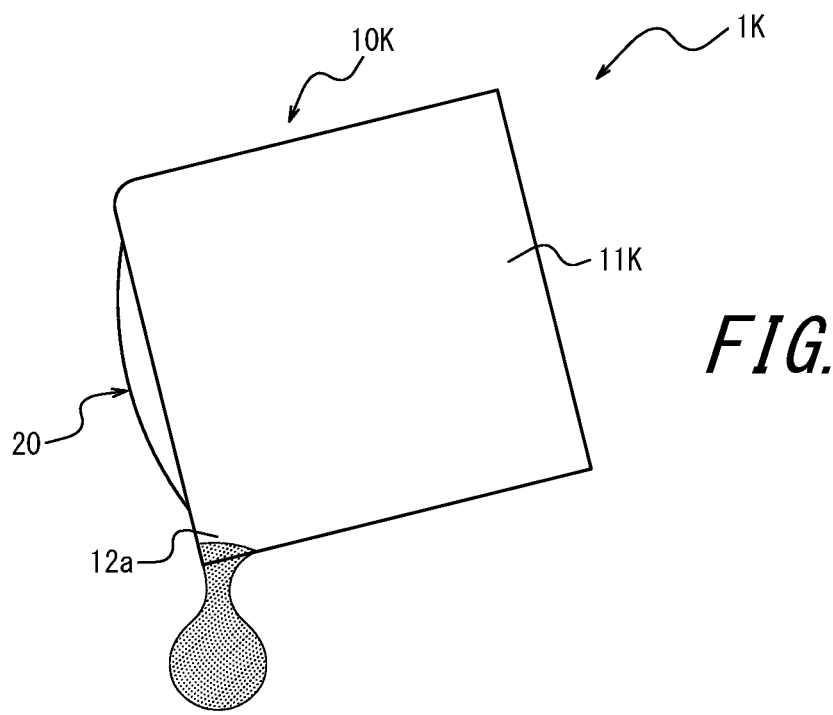
FIG. 20 is a side view of the vehicle-mounted camera illustrated in FIG. 19.

FIG. 19 is a front perspective view of a vehicle-mounted camera 1K according to another example configuration 1 of the fifth embodiment of the present disclosure. FIG. 20 is a side view of the vehicle-mounted camera 1K illustrated in FIG. 19.

The vehicle-mounted camera 1K includes a housing 10K. The housing 10K includes a side surface portion 11K and a front surface portion 12K. The side surface portion 11K may have a shape corresponding to the shape of the front surface portion 12.

The front surface portion 12K has a substantially pentagonal shape in an elevation view, as illustrated in FIG. 19. The front surface portion 12K is not limited to a substantially pentagonal shape. The front surface portion 12K simply needs to have a substantially polygonal shape, including a substantially triangular shape or a substantially rhombus shape. The front surface portion 12K may have a substantially polygonal shape including six or more corners.

The front surface portion 12K includes at least one corner portion 12a opposing the ground. The front surface portion 12K includes two corner portions 12b and two corner portions 12c, in addition to the corner portion 12a. The corner portion 12a has the smallest angle of the corner portions 12a to 12c included in the front surface portion 12K and is located closest the ground side than the corner portions 12b and 12c. This configuration further facilitates the accumulation of water droplets having slid down to under the lens 20 in the corner portion 12a located on the ground side. Further, water droplets accumulated in the corner portion 12a can fall to the ground more easily. Thus, the quality of the captured image by the vehicle-mounted camera 1 can be further improved.

Other configurations and effects of the vehicle-mounted camera 1K illustrated in FIG. 19 and FIG. 20 are similar to those of the vehicle-mounted camera 1J illustrated in FIG. 17 and FIG. 18.

Another Example Configuration 2

Figure 21:
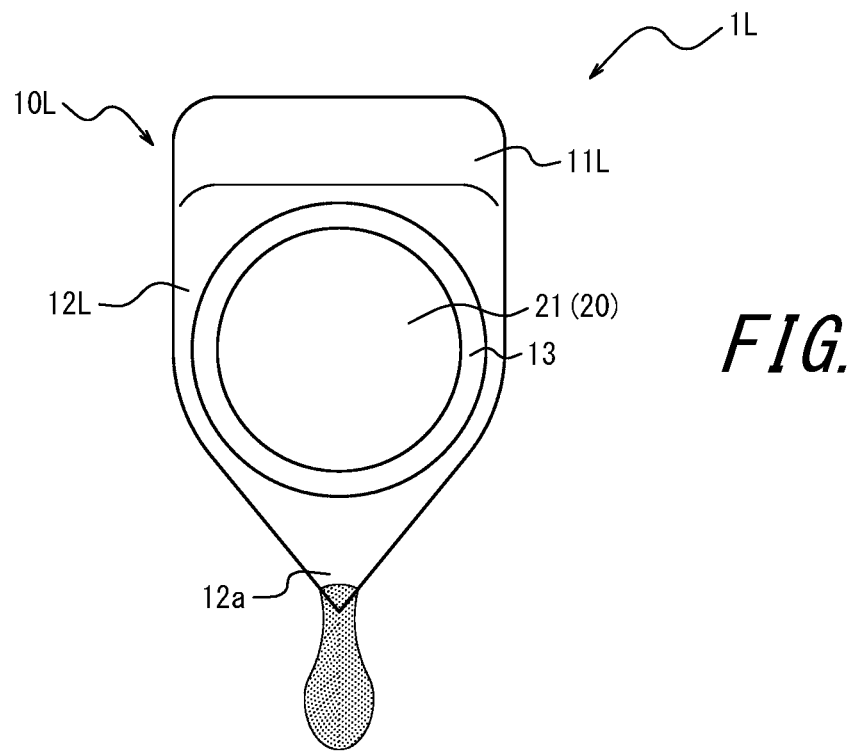
FIG. 21 is a front perspective view of a vehicle-mounted camera according to another example configuration 2 of the fifth embodiment of the present disclosure.
Figure 22:
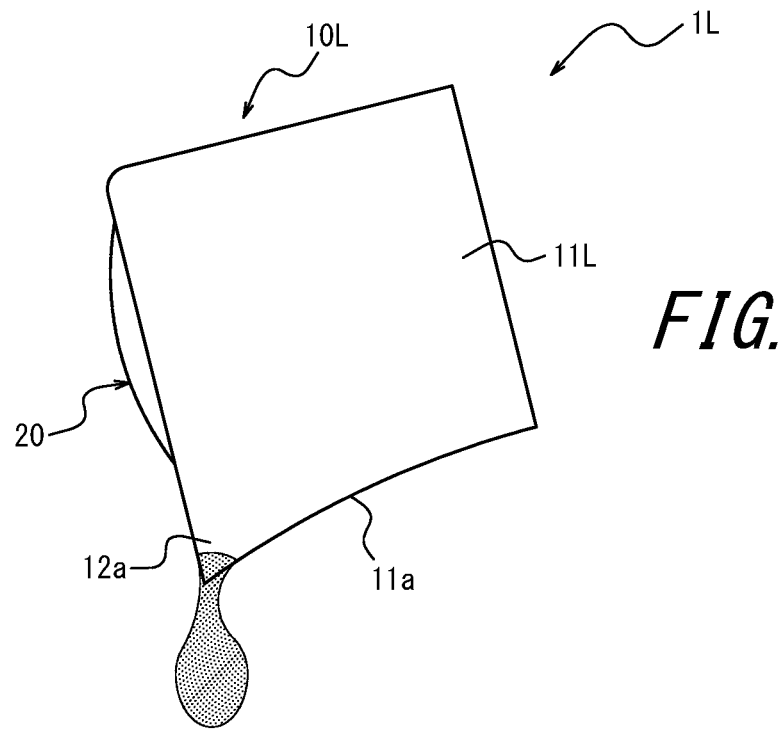
FIG. 22 is a side view of the vehicle-mounted camera illustrated in FIG. 21.

FIG. 21 is a front perspective view of a vehicle-mounted camera 1L according to another example configuration 2 of the fifth embodiment of the present disclosure. FIG. 22 is a side view of the vehicle-mounted camera 1L illustrated in FIG. 21.

The vehicle-mounted camera 1L includes a housing 10L. The housing 10L has a side surface portion 11L and a front surface portion 12L.

The side surface portion 11L includes an inclined portion 11a. The inclined portion 11a extends from the corner portion 12a of the front surface portion 12L in a manner inclined with respect to the ground in a direction opposite from a direction in which the subject is located. The inclined portion 11a may extend to the side opposite from the ground side, as illustrated in FIG. 22. The inclined portion 11a may have a convex curved shape opposing the opposite side from the ground side in a side view as illustrated in FIG. 22. Because the housing 10L has the inclined portion 11a, the angle of the corner portion 12a can be smaller in the side view illustrated in FIG. 22. This configuration facilitates the dropping of water droplets accumulated in the corner portion 12a to the ground or the like via the inclined portion 11a. Thus, the water droplets can be further suppressed from accumulating on the lens 20.

The front surface portion 12L has a substantially pentagonal shape, in a manner similar to the front surface portion 12K illustrated in FIG. 19.

Other configurations and effects of the vehicle-mounted camera 1L illustrated in FIG. 21 and FIG. 22 are similar to those of the vehicle-mounted camera 1J illustrated in FIG. 17 and FIG. 18.

Another Example Configuration 3

Figure 23:
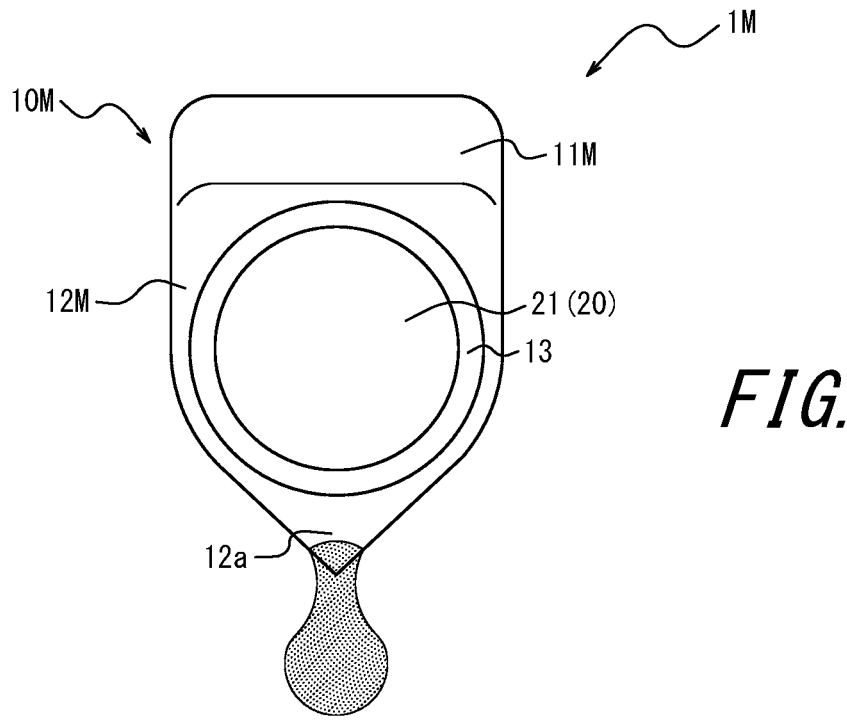
FIG. 23 is a front perspective view of a vehicle-mounted camera according to another example configuration 3 of the fifth embodiment of the present disclosure.
Figure 24:
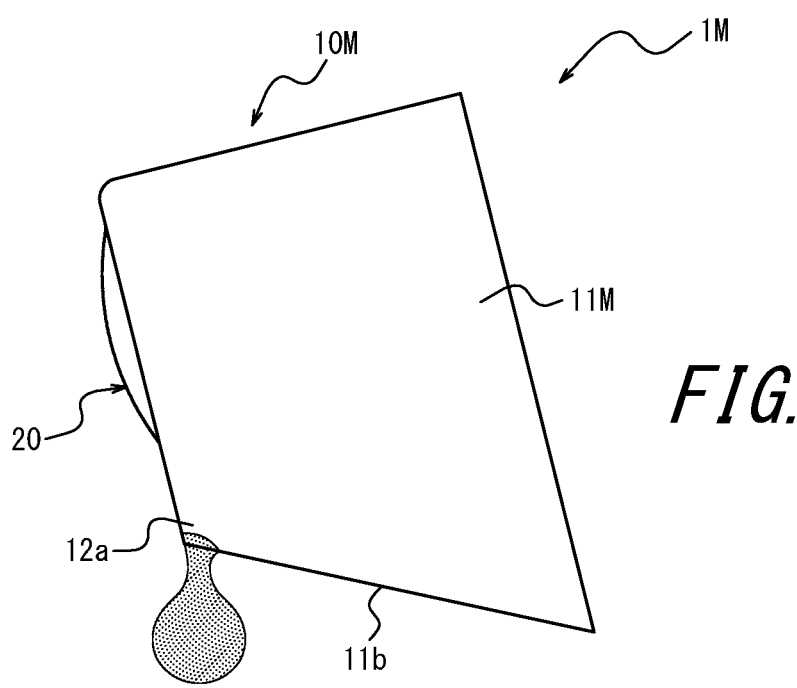
FIG. 24 is a side view of the vehicle-mounted camera illustrated in FIG. 23.

FIG. 23 is a front perspective view of a vehicle-mounted camera 1M according to another example configuration 3 of the fifth embodiment of the present disclosure. FIG. 24 is a side view of the vehicle-mounted camera 1M illustrated in FIG. 23.

The vehicle-mounted camera 1M includes a housing 10M. The housing 10M has a side surface portion 11M and a front surface portion 12M.

The side surface portion 11M includes an inclined portion 11b. The inclined portion 11b extends from the corner portion 12a of the front surface portion 12M in a direction opposite from a direction in which the subject is located in a manner inclined with respect to the ground. The inclined portion 11b may extend toward the ground, as illustrated in FIG. 23. The inclined portion 11b may be linear in a side view as illustrated in FIG. 22. This configuration facilitates the sliding of water droplets accumulated in the corner portion 12a on the inclined portion 11b and thus facilitates the dropping of the water droplets to the ground or the like. Thus, the water droplets can be further suppressed from accumulating on the lens 20.

Other configurations and effects of the vehicle-mounted camera 1M illustrated in FIG. 23 and FIG. 24 are similar to those of the vehicle-mounted camera 1J illustrated in FIG. 17 and FIG. 18.

In the vehicle-mounted cameras 1J to 1M according to the fifth embodiment, as described above, the housings 10J to 10M respectively have the front surface portions 12J to 10M respectively including at least one corner portion 12a opposing the ground. This configuration can suppress water droplets from accumulating in the bottom of the lens 20, as described above. Thus, the quality of the captured image by the vehicle-mounted camera 1 can be improved. According to the fifth embodiment, thus, the vehicle-mounted cameras 1J to 1M that improve the quality of the captured image can be provided.

Mobile Body

The vehicle-mounted cameras 1, 1A to 1H, and 1J to 1M of the present disclosure may be mounted on a mobile body. The term "mobile body" as used herein encompasses, for example, vehicles, ships, and aircrafts. The term "vehicle" as used herein encompasses, but is not limited to, automobiles, rail vehicles, industrial vehicles, and domestic vehicles. For example, the vehicle may include fixed wing aircrafts that travel on a runway. Automobiles include cars, trucks, buses, motorcycles, and trolley buses, but are not limited thereto and may also include other automobiles that travel on the road. Rail vehicles include locomotives, freight cars, passenger cars, trams, guided track railroads, ropeways, cable cars, linear motor cars and monorails, but are not limited thereto and may also include other vehicles that travel on the track. Industrial vehicles include agricultural vehicles and construction vehicles. Industrial vehicles include, but are not limited to, forklifts and golf carts. Industrial vehicles for agricultural purpose include, but are not limited to, tractors, tillers, transplanters, binders, combined harvesters, and lawn mowers. Industrial vehicles for construction purposes include, but are not limited to, bulldozers, scrapers, excavators, crane trucks, dump trucks, and load rollers. Life vehicles may include, but are not limited to, bicycles, wheelchairs, strollers, wheelbarrows, electric standing two-wheeled vehicles. Power engines of vehicles include, but are not limited to, internal combustion engines including diesel engines, gasoline engines, and hydrogen engines, and electric engines including motors. Vehicles include human-power vehicles traveling on human power. Classification of the vehicles is not limited to the above. For example, vehicles may include industrial vehicles authorized to travel on the road, and a plurality of categories may include the same type of vehicle.

Figure 25:
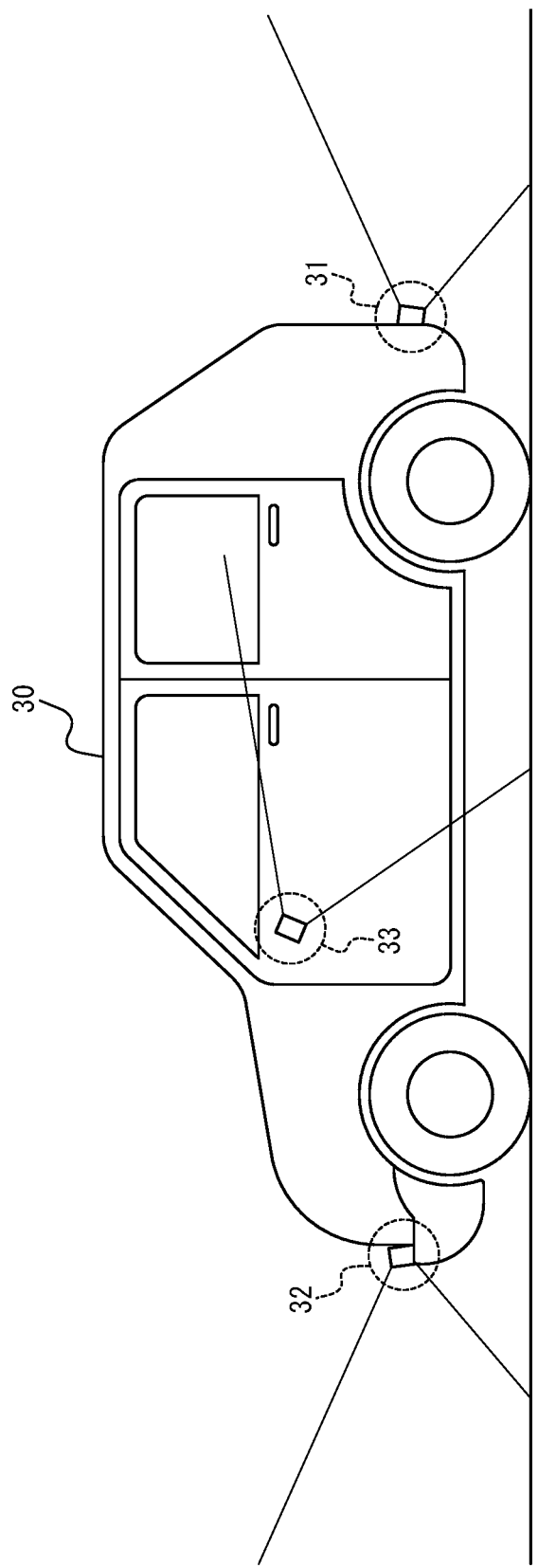
FIG. 25 is a diagram illustrating an example mounting position of a vehicle-mounted camera on a vehicle.

FIG. 25 illustrates positions of the vehicle-mounted cameras 1, 1A to 1H, and 1J to 1M of the present disclosure mounted on a mobile body 30, which is an automobile. The vehicle-mounted cameras 1, 1A to 1H, and 1J to 1M can be installed at any one or more positions including a vehicle rear portion 31, a vehicle front portion 32, and a vehicle side portion 33. The vehicle rear portion 31 is positioned in the vicinity of, for example, a rear bumper or a license plate (a number plate). The vehicle front portion 32 is positioned in the vicinity of, for example, the front grille or the front bumper. The vehicle side portion 33 is positioned in the vicinity of, for example, a side mirror. The vehicle-mounted cameras 1, 1A to 1H, and 1J to 1M mounted at these positions can be respectively referred to as a rear camera, a front camera, and a side camera. The rear camera, the front camera, and the side camera can respectively capture an image of a rear region, a front region, and a side region. In many cases, the vehicle-mounted cameras 1, 1A to 1H, and 1J to 1M are arranged in a manner such that the optical axes are inclined with respect to the road surface, rather than being directed in the horizontal direction. The vehicle-mounted cameras 1, 1A to 1H, and 1J to 1M may be able to take wide-angle photography, and the vehicle-mounted cameras 1, 1A to 1H, and 1J to 1M arranged at a plurality of positions can together capture the entire circumference of the vehicle.

Although the above embodiments have been described based on the figures and the examples, it should be apparent to those skilled in the art that various modifications and alterations can be made without departing from the present disclosure. Accordingly, such modifications and alterations are to be included in the scope of the present disclosure. For example, a function included in each element or each step can be rearranged without logical inconsistency, such that a plurality of elements or steps are combined together, or one element or step is subdivided. It should be understood that, although apparatuses have been mainly described above as the embodiments of the disclosure herein, the embodiments of the present disclosure may also be substantialized by a method that includes a step to be executed by each element of the apparatus. The embodiments of the present disclosure can be implemented by a method to be executed by a processor included in an apparatus, a program, or a storage medium storing the program. Thus, it should be appreciated that such method, program, and storage medium are included in the scope of the disclosure herein.

In the present disclosure, the vehicle-mounted camera is not limited to one that captures an image in the visible light region. The vehicle-mounted camera includes an infrared camera.

REFERENCE SIGNS LIST 1, 1A to 1H, 1J to 1M vehicle-mounted camera
10, 10D to 10H, 10J to 10M housing
11, 11J to 11M side surface portion
11a, 11b inclined portion
12, 12J to 12M front surface portion
12a corner portion
13 support portion
14 inner wall
imaging circuit
16D to 16H water guide portion
17D to 17H slope
18D to 18H side surface
19D to 19H connection portion
17H-1, 17H-2 branch portion
19H-1, 19H-2 branch portion
19a connection portion
20, 20A to 20C lens
21, 21A, 21B first surface
22 second surface
23, 23C side surface
30 vehicle (mobile body)
31 vehicle rear portion
32 vehicle front portion
33 vehicle side portion
100 water droplet
101 solid
102 droplet

The invention claimed is:

1. A vehicle-mounted camera comprising:
a lens arranged closest to a subject side; and
a housing that supports the lens,
wherein
the lens has a first surface facing the subject side and a side surface being located around the first surface,
the housing includes an inner wall surrounding the side surface,
the first surface and the side surface are at least partially subjected to a surface treatment that changes their water-contact characteristics,
a clearance is provided between the inner wall and the side surface, and
a water-contact angle of the side surface is smaller than a water-contact angle of the first surface.

2. The vehicle-mounted camera according to claim 1,
wherein the lens has a second surface facing an opposite side from the subject side, and
the water-contact angle of the first surface is smaller than 5 degrees, and a water-slide angle of the first surface is smaller than 10 degrees.

3. The vehicle-mounted camera according to claim 1,
wherein the lens has a second surface facing an opposite side from the subject side, and
the water-contact angle of the first surface exceeds 105 degrees, and a water-slide angle of the first surface is smaller than 10 degrees.

4. The vehicle-mounted camera according to claim 1,
wherein the lens has a second surface facing an opposite side from the subject side,
the water-contact angle of the first surface is smaller than 5 degrees, and
a water-contact angle of the second surface is smaller than 5 degrees.

5. The vehicle-mounted camera according to claim 1,
wherein the lens has a second surface facing an opposite side from the subject side,
the water-contact angle of the first surface is smaller than 5 degrees, and a water-slide angle of the second surface is smaller than 10 degrees.

6. The vehicle-mounted camera according to claim 1,
wherein the lens has a second surface facing an opposite side from the subject side,
the water-contact angle of the first surface exceeds 105 degrees, and a water-contact angle of the second surface is smaller than 5 degrees.

7. The vehicle-mounted camera according to claim 1,
wherein the lens has a second surface facing an opposite side from the subject side,
the water-contact angle of the first surface exceeds 105 degrees, and a water-slide angle of the second surface is smaller than 10 degrees.

8. The vehicle-mounted camera according to claim 2,
wherein a water-contact angle of the second surface is smaller than 5 degrees.

9. The vehicle-mounted camera according to claim 2,
wherein a water-slide angle of the second surface is smaller than 10 degrees.

10. The vehicle-mounted camera according to claim 3,
wherein a water-contact angle of the second surface is smaller than 5 degrees.

11. The vehicle-mounted camera according to claim 3,
wherein a water-slide angle of the second surface is smaller than 10 degrees.

12. The vehicle-mounted camera according to claim 1, wherein
a water-contact angle of a predetermined region of the first surface is larger than a water-contact angle of a region of the first surface other than the predetermined region, and
the predetermined region is a region associated with a captured image by the vehicle-mounted camera.

13. The vehicle-mounted camera according to claim 1, wherein the housing has a slope that extends to a ground from under the lens exposed from the housing, in a manner inclined with respect to the ground.

14. The vehicle-mounted camera according to claim 1, wherein the housing includes a front surface portion that has at least one corner portion facing a ground and exposes a portion of a lens.

15. A vehicle-mounted camera comprising:
a lens arranged closest to a subject side; and
a housing that supports the lens,
wherein
the lens is at least partially subjected to a surface treatment that changes its water-contact characteristics, or
the housing has at least a shape that changes its water-contact characteristics, or
the housing is at least subjected to a surface treatment that changes its water-contact characteristics,
wherein the housing includes a front surface portion that has at least one corner portion facing a ground and exposes a portion of a lens, and
wherein the front surface portion has an inverted water-drop shape.

16. The vehicle-mounted camera according to claim 14, wherein the front surface portion has a substantially polygonal shape.

17. The vehicle-mounted camera according to claim 14, wherein the housing further has a side surface portion being located around the front surface portion, and
the side surface portion includes an inclined portion that extends from the at least one corner portion in a manner inclined with respect to the ground in a direction opposite from a direction in which a subject is located.

18. A mobile body comprising:
a vehicle-mounted camera including a lens arranged closest to a subject side and a housing that supports the lens,
wherein
the lens has a first surface facing the subject side and a side surface being located around the first surface,
the housing includes an inner wall surrounding the side surface,
the first surface and the side surface are at least partially subjected to a surface treatment that changes their water-contact characteristics,
a clearance is provided between the inner wall and the side surface, and
a water-contact angle of the side surface is smaller than a water-contact angle of the first surface.

19. A vehicle-mounted camera comprising:
a lens arranged closest to a subject side; and
a housing that supports the lens,
wherein
the lens is at least partially subjected to a surface treatment that changes its water-contact characteristics, or
the housing has at least a shape that changes its water-contact characteristics, or
the housing is at least subjected to a surface treatment that changes its water-contact characteristics,
wherein the housing has a slope that extends to a ground from under the lens exposed from the housing, in a manner inclined with respect to the ground,
wherein the housing further includes a connection portion that connects a lower end portion of an outer surface of the lens exposed from the housing and the slope, and
wherein a water-contact angle of the outer surface of the connection portion is smaller than a water-contact angle of the lower end portion.

* * * * *